(12) United States Patent
Markt

(10) Patent No.: US 10,609,865 B2
(45) Date of Patent: *Apr. 7, 2020

(54) FLEXIBLE ROW CROP HEADER FOR AN AGRICULTURAL HARVESTER

(71) Applicant: Kevin Markt, Oregon, MO (US)

(72) Inventor: Kevin Markt, Oregon, MO (US)

(\*) Notice: Subject to any disclaimer, the term of this patent is extended or adjusted under 35 U.S.C. 154(b) by 0 days.

This patent is subject to a terminal disclaimer.

(21) Appl. No.: 15/798,253

(22) Filed: Oct. 30, 2017

(65) Prior Publication Data
US 2018/0054967 A1 Mar. 1, 2018

Related U.S. Application Data

(63) Continuation of application No. 14/585,126, filed on Dec. 29, 2014, now Pat. No. 9,801,343, which is a continuation of application No. 14/165,463, filed on Jan. 27, 2014, now Pat. No. 8,919,086, which is a continuation of application No. 12/850,515, filed on Aug. 4, 2010, now Pat. No. 8,635,842.

(60) Provisional application No. 61/231,487, filed on Aug. 5, 2009.

(51) Int. Cl.
| | | |
|---|---|---|
| A01D 45/00 | (2018.01) | |
| A01D 41/14 | (2006.01) | |
| A01D 45/02 | (2006.01) | |

(52) U.S. Cl.
CPC ............ *A01D 45/00* (2013.01); *A01D 41/14* (2013.01); *A01D 45/021* (2013.01)

(58) Field of Classification Search
CPC ....... A01B 73/044; A01B 63/32; A01B 73/02; A01B 73/04; A01D 41/144; A01D 41/14; A01D 45/021; A01D 41/141
See application file for complete search history.

(56) References Cited

U.S. PATENT DOCUMENTS

| | | | |
|---|---|---|---|
| 3,258,901 A | | 7/1966 | Van Der Lely et al. |
| 3,345,808 A | * | 10/1967 | Van Der Lely ...... A01D 34/246 56/10.2 R |
| 3,468,107 A | | 9/1969 | Van Der Lely |
| 3,491,836 A | * | 1/1970 | Doepker ................ A01B 73/02 172/311 |
| 3,540,195 A | | 11/1970 | Van Der Lely |
| 3,683,601 A | * | 8/1972 | Van Der Lely ...... A01D 41/144 56/6 |
| 3,736,735 A | | 6/1973 | Kulak et al. |
| 3,841,412 A | | 10/1974 | Sosalla |
| 4,023,623 A | * | 5/1977 | Anderson ............ A01B 73/044 172/311 |

(Continued)

FOREIGN PATENT DOCUMENTS

WO 2008034217 A1 3/2008

*Primary Examiner* — Arpad Fabian-Kovacs
(74) *Attorney, Agent, or Firm* — Thomas J. Oppold; Larkin Hoffman Daly & Lindgren, Ltd.

(57) ABSTRACT

A row crop header for a harvester having a subframe removably coupleable to a feeder housing of the harvester. A pivot assembly is supported by the subframe permitting first and second header sections to pivotably move between raised and lowered positions together or independently of the other. A cross-auger center suspension assembly rotateably supports one end of the first cross-auger section and one end of the second cross-auger section as the first and second header sections pivotally move between the raised and lowered positions.

12 Claims, 24 Drawing Sheets

(56) References Cited

U.S. PATENT DOCUMENTS

| | | | | |
|---|---|---|---|---|
| 4,074,766 | A * | 2/1978 | Orthman | A01B 73/04 172/311 |
| 4,115,983 | A | 9/1978 | Barnes et al. | |
| 4,300,333 | A | 11/1981 | Anderson | |
| 4,316,511 | A | 2/1982 | Andersen | |
| 4,324,296 | A * | 4/1982 | Schenk | A01B 73/044 172/311 |
| 4,328,869 | A * | 5/1982 | Perelli | A01B 73/044 172/311 |
| RE31,209 | E * | 4/1983 | Anderson | A01B 73/044 172/311 |
| 4,409,780 | A * | 10/1983 | Beougher | A01B 73/02 172/456 |
| 4,446,683 | A | 5/1984 | Rempel et al. | |
| 4,487,004 | A * | 12/1984 | Kejr | A01D 41/14 56/14.4 |
| 4,612,757 | A | 9/1986 | Halls et al. | |
| 4,660,360 | A | 4/1987 | Hardesty et al. | |
| 4,733,523 | A | 3/1988 | Dedeyne et al. | |
| 4,776,153 | A | 10/1988 | Depauw et al. | |
| 4,790,389 | A * | 12/1988 | Adee | A01B 35/30 172/311 |
| 4,825,958 | A * | 5/1989 | Kelderman | A01B 73/00 172/311 |
| 4,878,545 | A * | 11/1989 | Dyken | A01B 73/04 172/311 |
| 4,892,154 | A | 1/1990 | Ranner | |
| 4,903,470 | A | 2/1990 | Hemker et al. | |
| 4,923,017 | A * | 5/1990 | Meek | A01B 73/044 172/456 |
| 5,067,264 | A * | 11/1991 | Beeley | A01B 33/087 172/112 |
| 5,329,753 | A | 7/1994 | Arnold et al. | |
| 5,359,836 | A | 11/1994 | Zeuner et al. | |
| 5,415,586 | A | 5/1995 | Hanson et al. | |
| 5,632,106 | A | 5/1997 | Sinykin | |
| 5,673,543 | A * | 10/1997 | Richardson | A01D 41/144 56/228 |
| 5,724,798 | A * | 3/1998 | Stefl | A01D 41/144 172/311 |
| 5,845,472 | A * | 12/1998 | Arnold | A01D 41/144 56/228 |
| 5,911,625 | A | 6/1999 | Von Allworden | |
| 5,918,448 | A | 7/1999 | Wheeler | |
| 5,960,618 | A | 10/1999 | Kerber | |
| 6,082,467 | A * | 7/2000 | Friesen | A01B 73/065 111/57 |
| 6,223,831 | B1 * | 5/2001 | Friggstad | A01B 59/042 172/311 |
| 6,247,297 | B1 | 6/2001 | Becker | |
| 6,263,977 | B1 * | 7/2001 | Mayerle | A01B 63/102 172/311 |
| 6,293,353 | B1 * | 9/2001 | Poole | A01B 59/00 16/366 |
| 6,302,220 | B1 * | 10/2001 | Mayerle | A01L 363/11 172/459 |
| 6,318,477 | B1 * | 11/2001 | Bettin | A01B 63/32 172/452 |
| 6,412,259 | B1 * | 7/2002 | Wiegert | A01D 45/025 56/60 |
| 6,598,381 | B2 | 7/2003 | Albinger et al. | |
| 6,615,570 | B2 | 9/2003 | Beck et al. | |
| 6,675,568 | B2 | 1/2004 | Patterson et al. | |
| 6,775,969 | B2 | 8/2004 | Wuebbels et al. | |
| 6,782,682 | B2 | 8/2004 | Steppat | |
| 6,782,683 | B2 | 8/2004 | Buermann | |
| 6,826,894 | B2 | 12/2004 | Thiemann et al. | |
| 7,043,889 | B2 * | 5/2006 | Rauch | A01B 73/046 56/15.9 |
| 7,073,604 | B1 * | 7/2006 | Dobson | A01B 63/32 111/57 |
| 7,162,855 | B2 | 1/2007 | Boeckmann et al. | |
| 7,191,582 | B2 | 3/2007 | Bomleny | |
| 7,197,865 | B1 * | 4/2007 | Enns | A01B 73/005 56/228 |
| 7,210,538 | B2 | 5/2007 | Gust et al. | |
| 7,310,931 | B2 | 12/2007 | Gramm | |
| 7,360,351 | B2 * | 4/2008 | Rickert | A01D 41/144 56/228 |
| 7,373,767 | B2 | 5/2008 | Calmer | |
| 7,404,283 | B2 | 7/2008 | Viaud | |
| 7,426,817 | B2 | 9/2008 | Coers | |
| 7,469,648 | B2 | 12/2008 | Bettin | |
| 7,478,521 | B2 | 1/2009 | Coers et al. | |
| 7,520,117 | B2 | 4/2009 | Rieck et al. | |
| 7,543,674 | B2 | 6/2009 | Rauch | |
| 7,549,482 | B2 * | 6/2009 | Wake | A01B 73/044 111/57 |
| 7,603,837 | B2 | 10/2009 | Ehrhart et al. | |
| 7,614,206 | B2 | 11/2009 | Tippery et al. | |
| 8,635,842 | B2 | 1/2014 | Markt | |
| 8,919,086 | B2 | 12/2014 | Markt | |
| 8,960,321 | B2 | 2/2015 | Tamm | |
| 9,198,357 | B2 * | 12/2015 | Gantzer | A01D 84/00 |
| 2002/0014064 | A1 * | 2/2002 | Wubbels | A01D 45/021 56/95 |
| 2002/0017090 | A1 | 2/2002 | Hockenbeck | |
| 2002/0017389 | A1 * | 2/2002 | Moser | A01B 63/32 172/311 |
| 2002/0035826 | A1 * | 3/2002 | Albinger | A01D 41/144 56/109 |
| 2003/0041579 | A1 * | 3/2003 | Wuebbels | A01D 41/144 56/15.2 |
| 2003/0074876 | A1 * | 4/2003 | Patterson | A01D 41/14 56/257 |
| 2003/0182912 | A1 * | 10/2003 | Boll | A01D 34/661 56/14.7 |
| 2003/0226342 | A1 * | 12/2003 | Boeckmann | A01D 41/144 56/14.7 |
| 2004/0123575 | A1 * | 7/2004 | Rickert | A01D 41/144 56/14.7 |
| 2004/0182060 | A1 * | 9/2004 | Rauch | A01B 73/046 56/15.9 |
| 2005/0109001 | A1 * | 5/2005 | Wolters | A01D 43/082 56/16.4 R |
| 2005/0211144 | A1 * | 9/2005 | Gust | A01B 73/044 111/54 |
| 2006/0117732 | A1 | 6/2006 | Wubbels et al. | |
| 2007/0204582 | A1 | 9/2007 | Coers et al. | |
| 2007/0204583 | A1 * | 9/2007 | Coers | A01D 57/02 56/14.4 |
| 2007/0283673 | A1 | 12/2007 | Coers et al. | |
| 2007/0289278 | A1 | 12/2007 | Coers et al. | |
| 2008/0047248 | A1 | 2/2008 | Haffert et al. | |
| 2008/0072560 | A1 * | 3/2008 | Talbot | A01D 41/14 56/208 |
| 2008/0295473 | A1 * | 12/2008 | Tippery | A01D 41/144 56/14.5 |
| 2009/0025354 | A1 | 1/2009 | Guldenpfennig et al. | |
| 2011/0290515 | A1 | 12/2011 | Yuen | |
| 2014/0033670 | A1 * | 2/2014 | Cressoni | A01D 41/144 56/104 |
| 2014/0075906 | A1 * | 3/2014 | Heim | A01D 61/004 56/105 |
| 2014/0075907 | A1 * | 3/2014 | Ritter | A01D 45/021 56/105 |
| 2014/0075909 | A1 * | 3/2014 | Bomleny | A01D 41/144 56/119 |
| 2016/0183461 | A1 * | 6/2016 | Neudorf | A01D 41/14 56/158 |
| 2016/0262301 | A1 * | 9/2016 | van Vooren | A01B 73/06 |

* cited by examiner

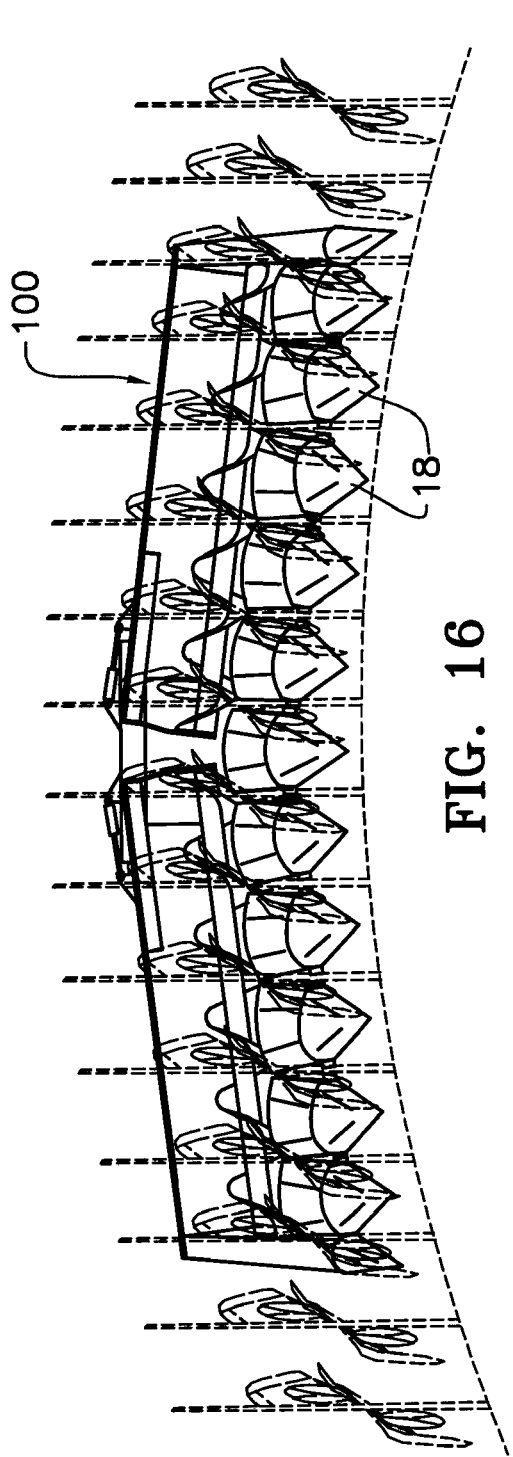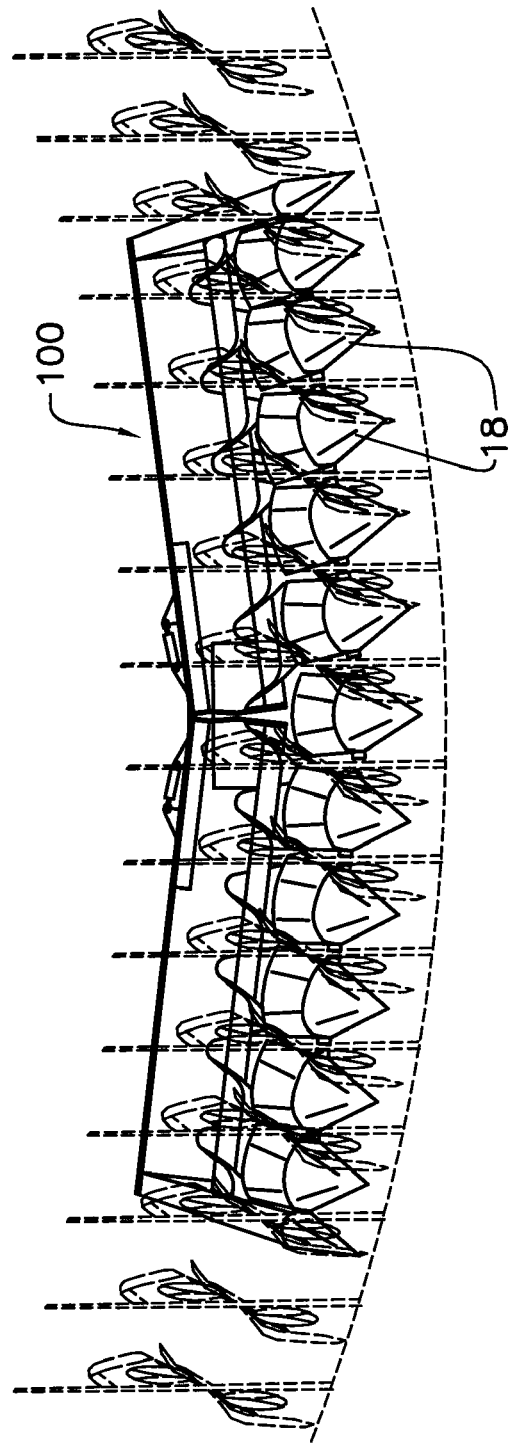

FLEXIBLE ROW CROP HEADER FOR AN AGRICULTURAL HARVESTER

CROSS-REFERENCE TO RELATED APPLICATIONS

This is a continuation of U.S. patent application Ser. No. 14/585,126, filed Dec. 29, 2014, which is a continuation of U.S. patent application Ser. No. 14/165,463, filed Jan. 27, 2014, now U.S. Pat. No. 8,919,086, which is a continuation of U.S. patent application Ser. No. 12/850,515 filed Aug. 4, 2010, now U.S. Pat. No. 8,635,842, which claims the benefit of U.S. Provisional Application No. 61/231,487 filed Aug. 5, 2009.

BACKGROUND

Combine harvesters or combines are equipped with removable heads or "headers" that are designed for harvesting particular types of crops. A "platform header" is typically used for cereal grains such as soybeans and various cereal crops such as wheat, oats and barley. A platform header is equipped with a reciprocating knife cutter bar and has a revolving reel which forces the cut crop into the header as the combine advances. A cross auger forces the cut grain into the feeder house of the combine where the grain is threshed and separated from the cut stalk and other crop chaff. "Draper headers" are similar to platform headers in that they utilize a reciprocating cutter bar and a revolving reel. However, instead of a cross auger, the draper header uses a fabric or rubber apron to feed the cut grain into the feeder house. Headers for row crops, particularly corn headers, are equipped with forwardly extending conical snouts which extend between the corn rows. Where adjacent snouts of the corn header converge, instead of cutting the stalk like a platform or draper header, adjacent stalk rollers pinch and pull the stalk downwardly stripping the corn ear from the stalk, so that the stalks pass under the header leaving primarily only the ear and husk enter the feeder house.

When combining or harvesting different crops using any of the foregoing types of headers, the header is typically operated at a height sufficiently low to the ground to ensure that the lowermost grain across the width of the header is not missed. As the crop varies in height or as the terrain varies across the field, the combine operator must adjust the height of the header up or down to ensure that the lowermost grain is not missed while also ensuring that no portion of the header runs aground.

Platform and draper headers can extend up to forty or more feet in width. Accordingly, to account for variations in terrain across the width of the header, especially for harvesting soybeans and other crops that have pods close to the ground, flexible platform and draper headers have been developed which utilize a cutter bar that flexes to better follow the contours of the terrain. However, heretofore, no such "flexible" header has yet been developed for row crops, particularly corn headers. With advances in combine technology, twelve and sixteen row corn headers have become common place and even twenty four row headers are now available. As a result, with corn headers now approaching the widths of platform and draper headers, there is now a need for corn headers to flex, bend or articulate so as to more closely follow the contours of the terrain to avoid missing corn.

For example, referring to FIG. 5, when combining over the crest of a hill with a large header of twelve rows or more, it may not be possible to lower the header sufficiently to avoid missing ears at the far ends of the header without running the header aground at the middle of the header. Likewise, referring to FIG. 6, when combining in a trough or valley between hills, it may not be possible to lower the header sufficiently to avoid missing ears in the middle of the header without running the header aground on the upwardly sloping hills at the far ends of the header.

While lateral tilt headers serve their intended purposes for operating on relatively uniform or consistent grades, the ability of the header to tilt laterally from side-to-side is not much more beneficial than a conventional fixed or non-titling header for harvesting on rolling terrain. For example, referring back to FIGS. 5 and 6, it should be appreciated that having the ability to laterally tilt the header to one side or the other will provide little or no benefit when harvesting over the crest of a hill as in FIG. 5 or in a valley as in FIG. 6. Similarly, referring to FIGS. 7 and 8, when combining along the base of a hill, even when the header is tilted laterally and in the lower most position without running the header aground at the far ends, the ears in the corn rows in the middle of the header may still be missed.

Accordingly, for harvesting row crops on rolling terrain, there is a need for a row crop header, particularly a corn header, that articulates or flexes so that sections of the header can be raised and lowered to more closely follow the terrain to avoid missing rows as the combine traverses the field.

DESCRIPTION OF THE DRAWINGS

FIG. 16 is an illustration of the flexible header of FIG. 9 on the crest of a hill and showing how, with the left and right sides of the header lowered, no ears will be missed because all corn ears across all of the rows of the header are above the stalk rollers.

FIG. 17 is an illustration of the flexible header of FIG. 9 in the valley between hills and showing how, with the left and right sides of the header raised, no ears will be missed because all corn ears across all of the rows of the header are above the stalk rollers.

DESCRIPTION

Figure 1:
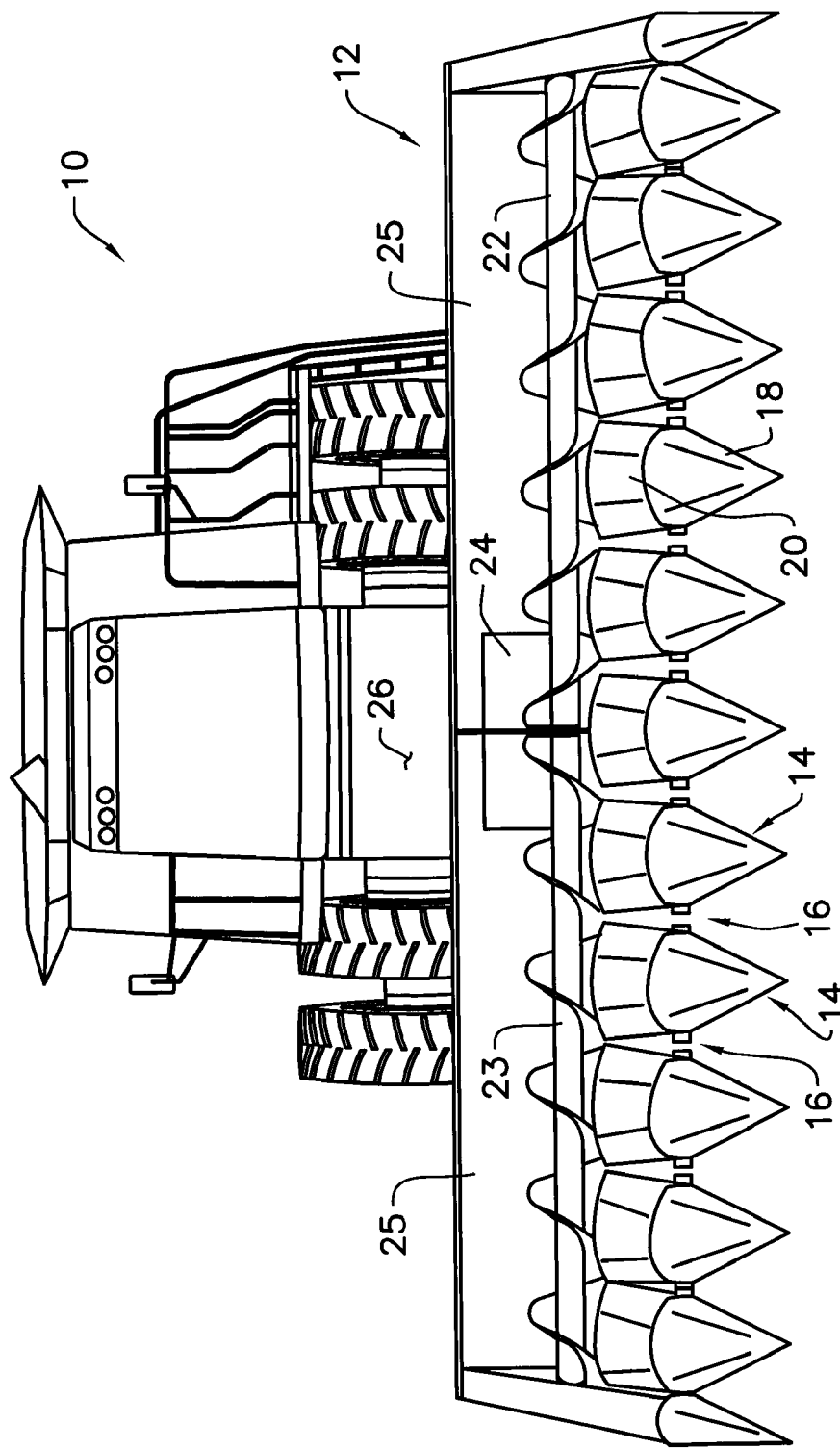
FIG. 1 is a front view of a conventional combine harvester with a conventional fixed corn head or a lateral tilt corn head in the horizontal position.
Figure 2:
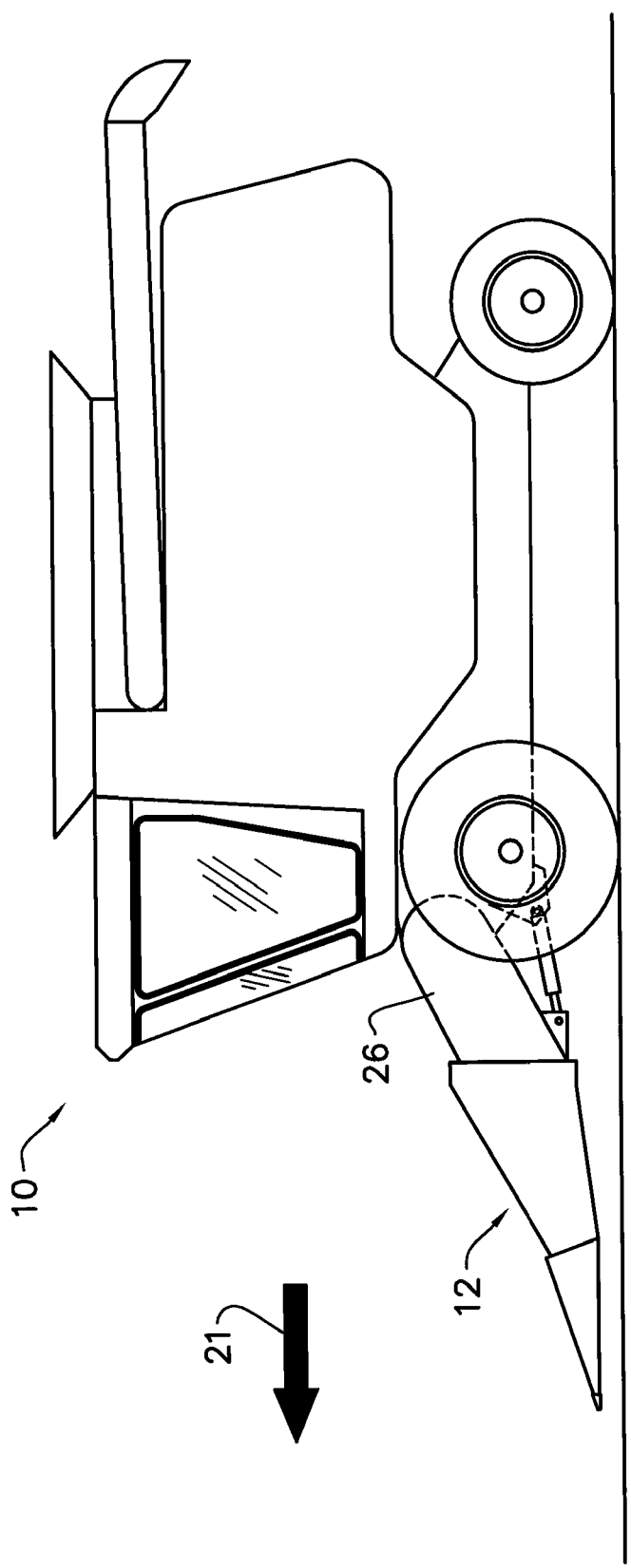
FIG. 2 is a side view of the combine and corn head of FIG. 1.

Referring now to the drawings, wherein like reference numerals designate identical or corresponding parts throughout the several views, FIG. 1 illustrates a conventional combine harvester 10 with a conventional corn head or header 12 mounted thereto in a conventional manner. As is typical, the header 12 includes a plurality of fore-and-aft extending row units 14. In the illustration of FIG. 1, the header 12 is illustrated as a twelve-row header, in that there are twelve channels or spaces 16 formed between adjacent row units 14 into which the corn stalks in each row are gathered as the combine advances.

As disclosed in U.S. Pat. No. 5,195,309 to Mossman, which is incorporated herein in its entirety by reference, each row unit 14 comprises a semi-conical rearwardly converging snout 18 and a semi-cylindrical rearward portion or hood 20. The snout 18 is typically made of polyethylene and includes a hardened or impact resistant point or tip. The snout 18 is pivotally mounted by bolts or pins (not illustrated) to the semi-cylindrical hood 20 which is fixed relative to the rest of the header. In operation, if the snout tip contacts the ground surface, the snout 18 will pivot upwardly about the pins to avoid damage to the snouts. A stop (not shown) prevents the snout 18 from pivoting downwardly past the general angle of the hood 20.

In operation, the combine 10 and header 12 are positioned such that each snout is between adjacent corn rows. As the combine advances in the direction indicated by arrow 21, the corn stalks are gathered between the rearwardly converging snouts 18. Stalk rolls (not visible) positioned below adjacent sides of the hoods 20 pinch and pull the stalk downwardly to strip the ear from the corn stalk. Gatherer chains (not visible), also positioned below adjacent sides of the hoods 20 act as conveyors to move the stripped loose ears rearwardly into the rotating left and right cross augers 22, 23. The cross augers 22, 23 move the ears toward the feeder house inlet opening 24 in the back wall 25 of the header 12. The ears then pass into the feeder house opening 24 and into the feeder house 26 which conveys the ears into the interior of the combine for threshing and shelling. The husks, the shelled cobs, and other unwanted crop debris are discharged out the rear of the combine while the shelled corn kernels are augured up into the holding tank until being unloaded.

Figure 3:
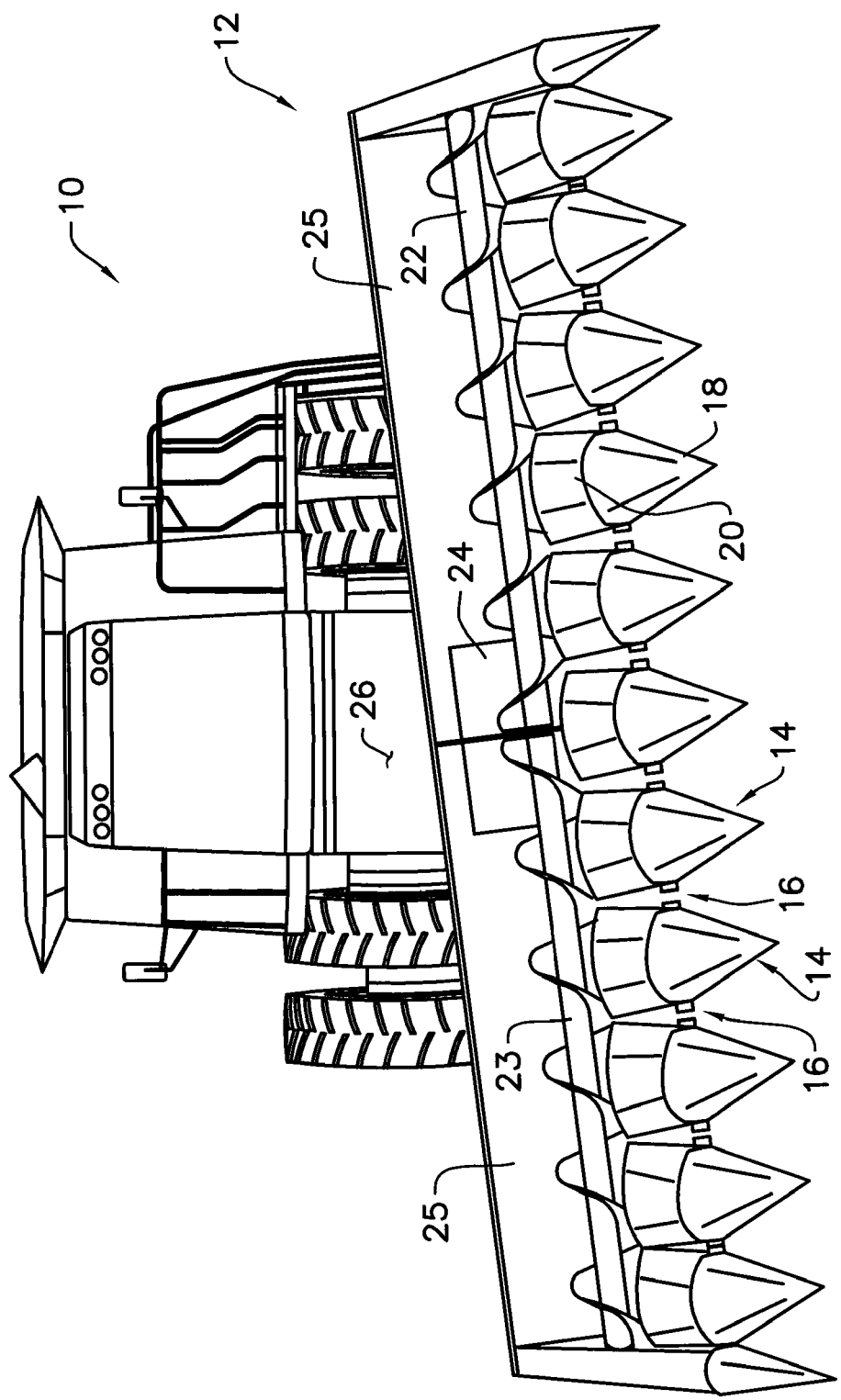
FIGS. 3 and 4 are front views of a conventional combine with a conventional lateral tilt.
Figure 4:
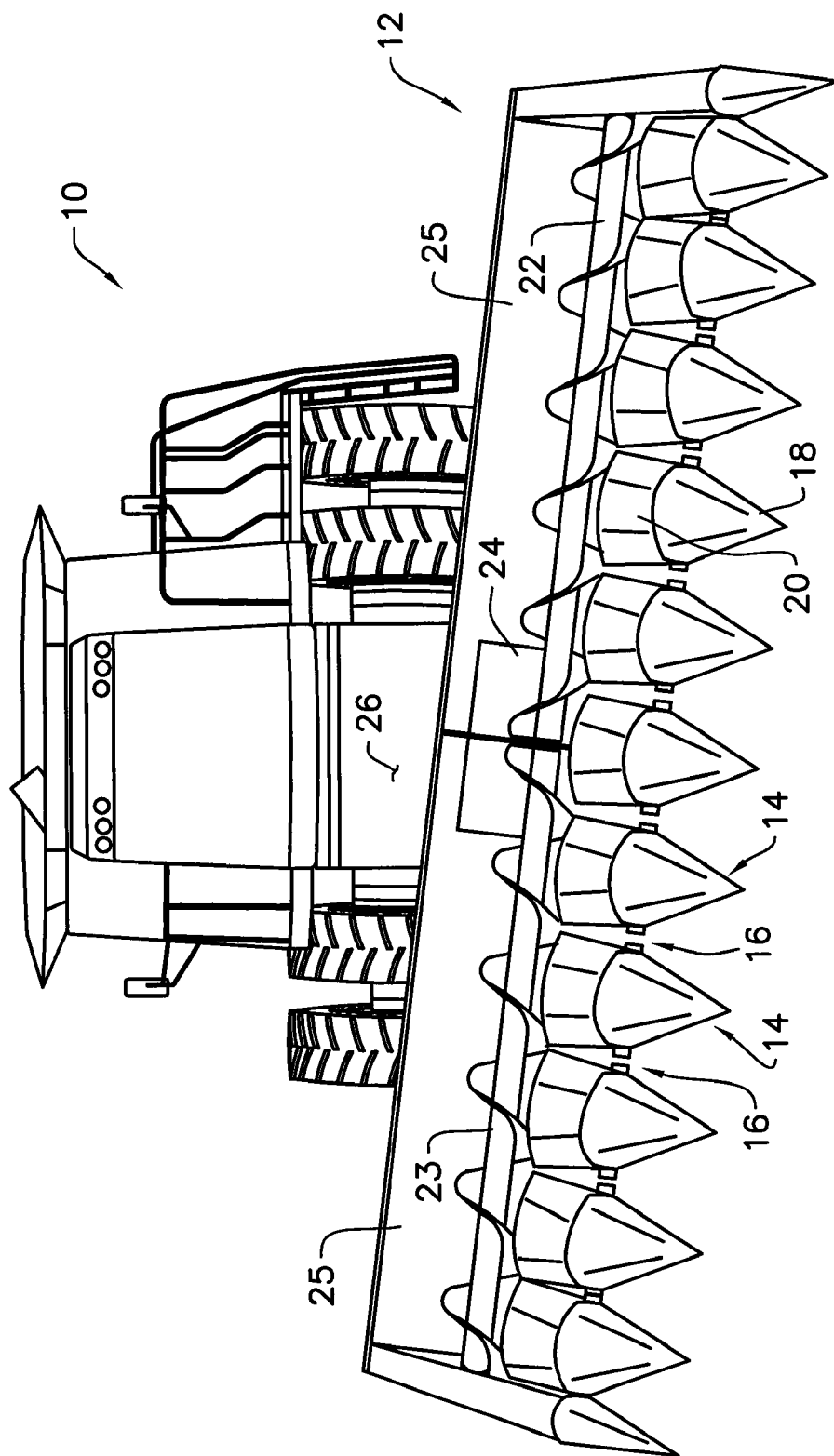

As illustrated in FIGS. 3 and 4, some combines are adapted to permit the header to be tilted from side-to-side. These "lateral tilt headers," such as disclosed in U.S. Pat. No. 5,415,586 to Hanson et al. or U.S. Pat. No. 7,191,582 to Bomleny, both of which are incorporated herein in their entirety by reference, are well known in the art. Fixed headers and lateral tilt headers are referred to throughout this specification as "conventional headers" and are both designated by reference numeral 12.

When harvesting under normal conditions, the header 12 is usually operated at a height where the bottom of the snouts 18 are a short distance above the ground surface to ensure that the stalk rolls and gathering chains are positioned below the ears as the combine advances and as the stalks are gathered between the snouts. However, when harvesting on rolling terrain, particularly with wide headers of twelve rows or more, it is often difficult, if not impossible, to position the header without missing some of the ears in some rows across the width of the header while not running one side or the other aground, or the middle of the header aground.

Figure 5:
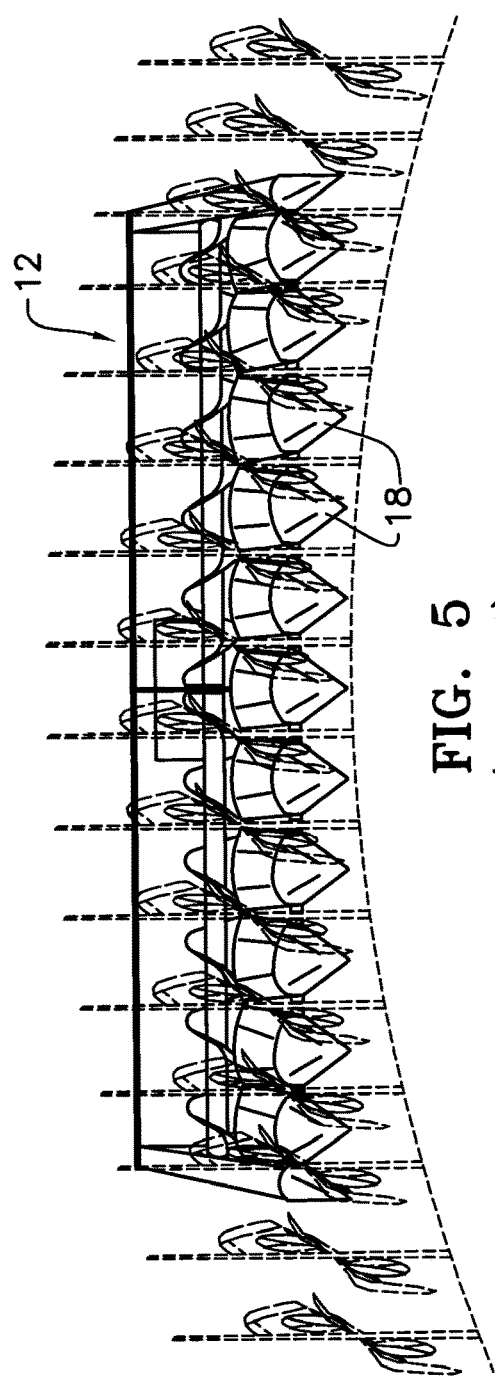
FIG. 5 is an illustration of a conventional header in the horizontal position on the crest of a hill and showing how the ears in the corn rows at the ends of the header will be missed because the corn ears are below the stalk rollers.
Figure 6:
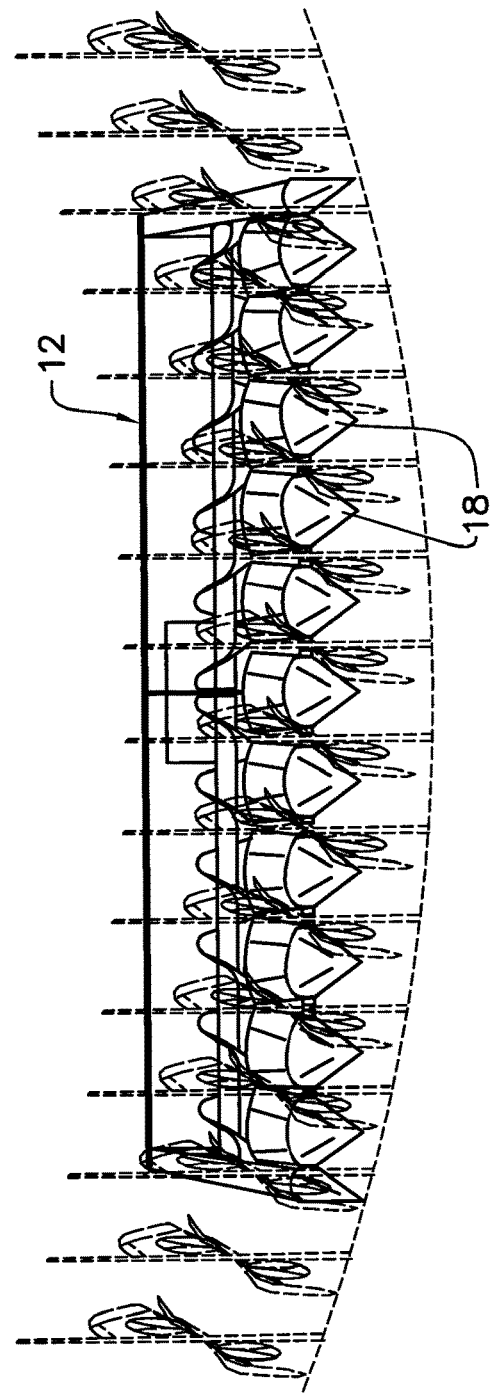
FIG. 6 is an illustration of a conventional header in the horizontal position in a valley between hills and showing how the ears in the corn rows in the middle of the header will be missed because the corn ears are below the stalk rollers.
Figure 7:
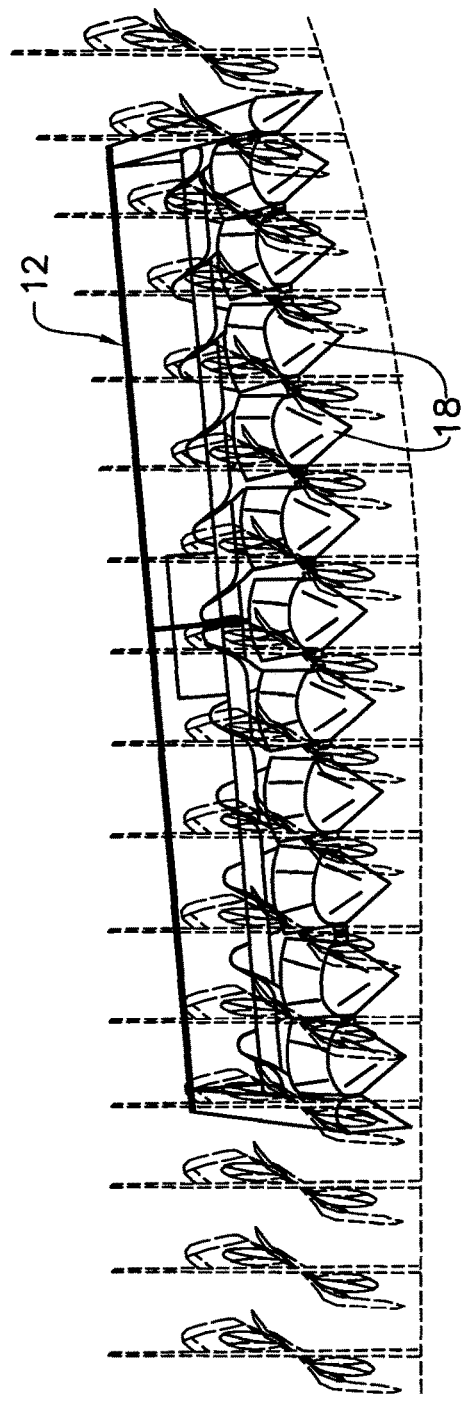
FIGS. 7 and 8 are illustrations of a conventional header at the base of a hill and showing how the ears in the corn rows in the middle of the header will be missed because the corn ears are below the stalk rollers.
Figure 8:
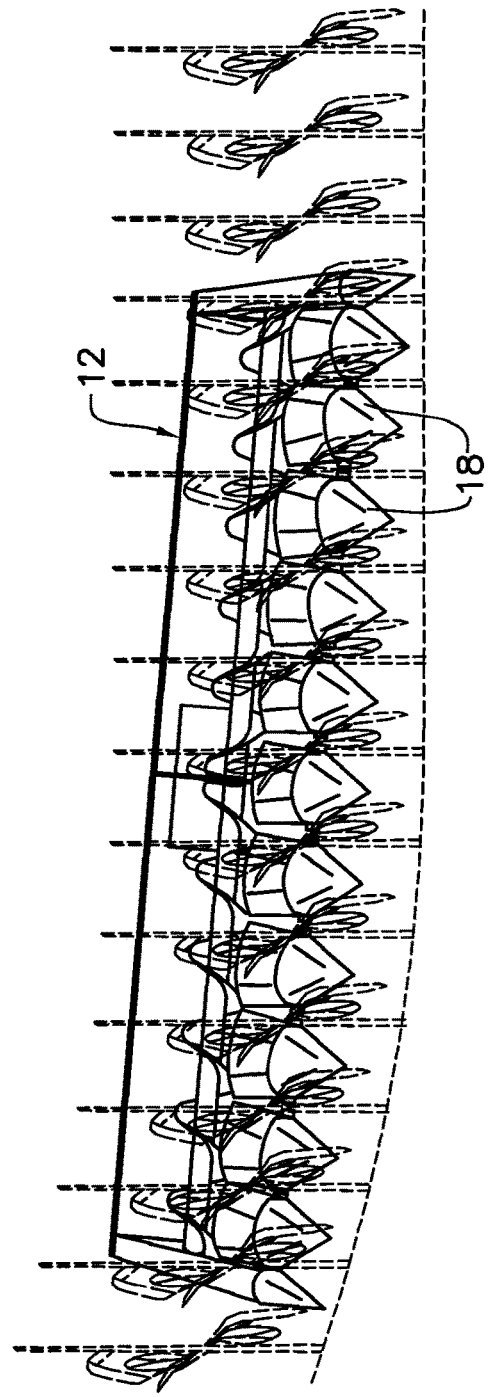

For example, FIG. 5 is an illustration of a conventional header on the crest of a hill and showing how the ears in the corn rows at the ends of the header will be missed because the corn ears are below the stalk rollers. Similarly, FIG. 6 is an illustration of a conventional header in a valley between hills and showing how the ears in the corn rows in the middle of the header will be missed because the corn ears are below the stalk rollers. FIGS. 7 and 8 are illustrations of a conventional header at the base of a hill and showing how, even with the header 12 tilted laterally, the ears in the corn rows in the middle of the header will still be missed because the corn ears are below the stalk rollers.

Figure 9:
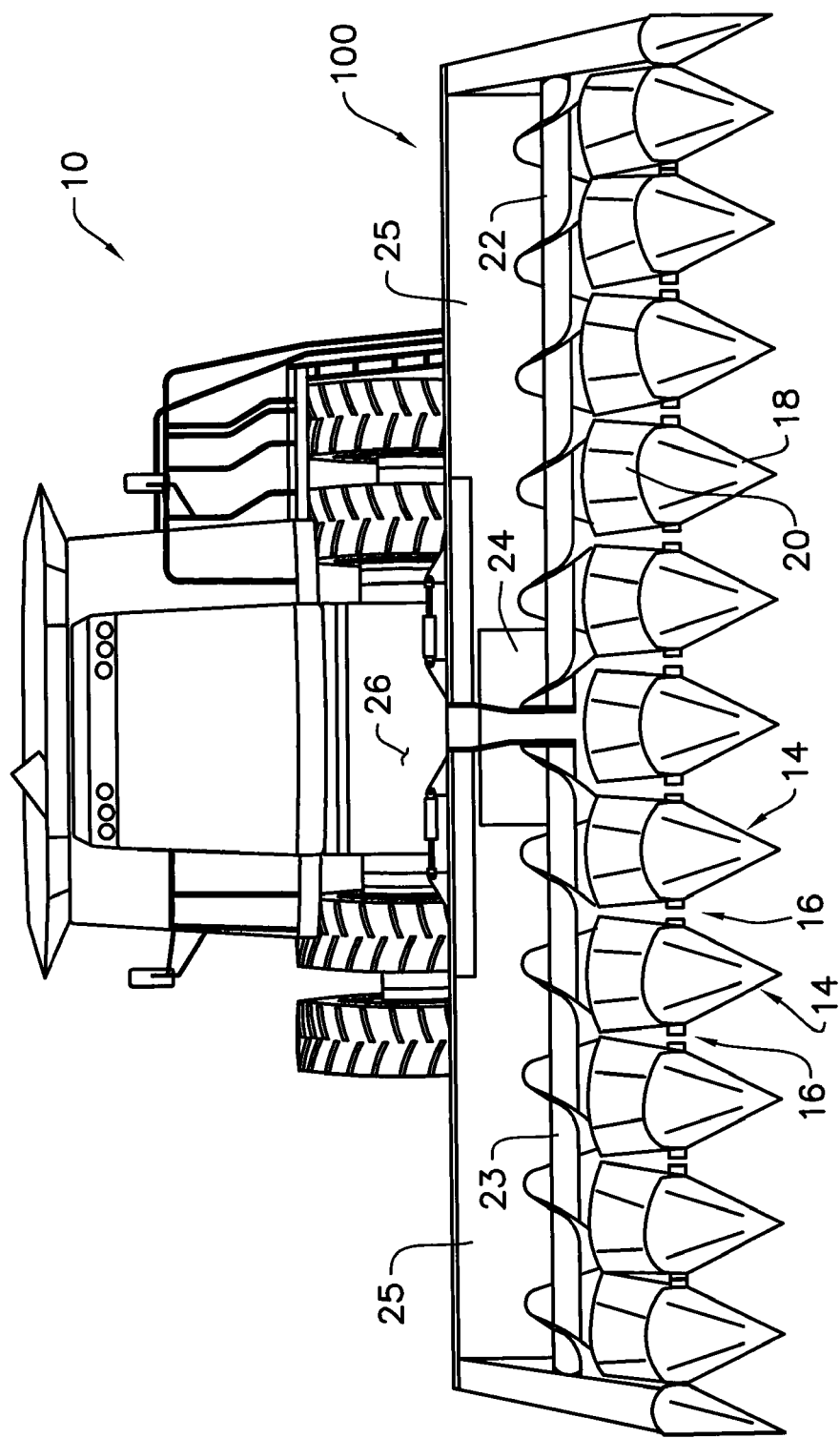
FIG. 9 is a front view of the combine of FIG. 1 but with an embodiment of a flexible header in accordance with the claimed invention in the normal or level position.
Figure 10:
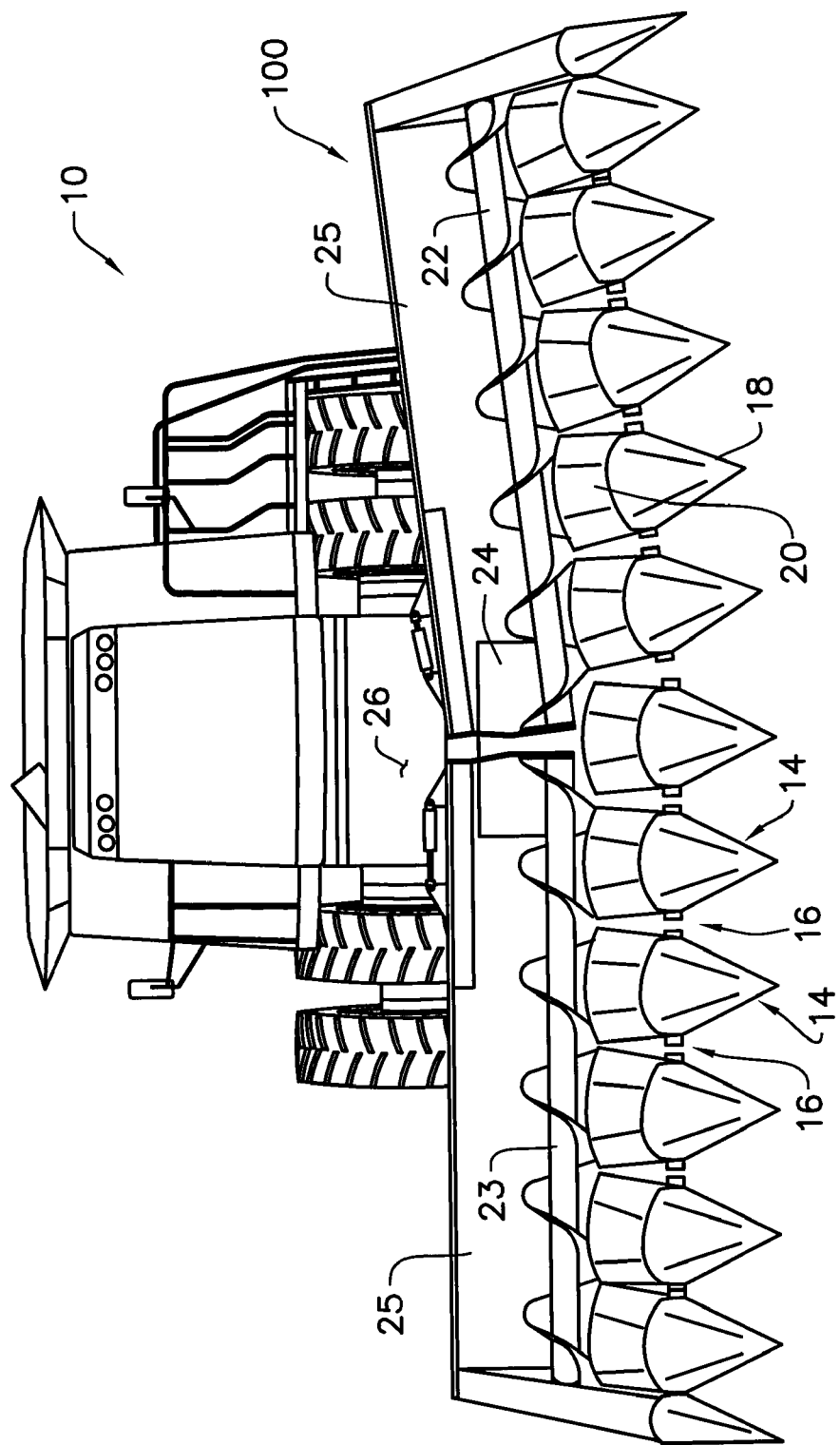
FIG. 10 is a front view of the combine and flexible header of FIG. 9 with the right side of the header raised.
Figure 11:
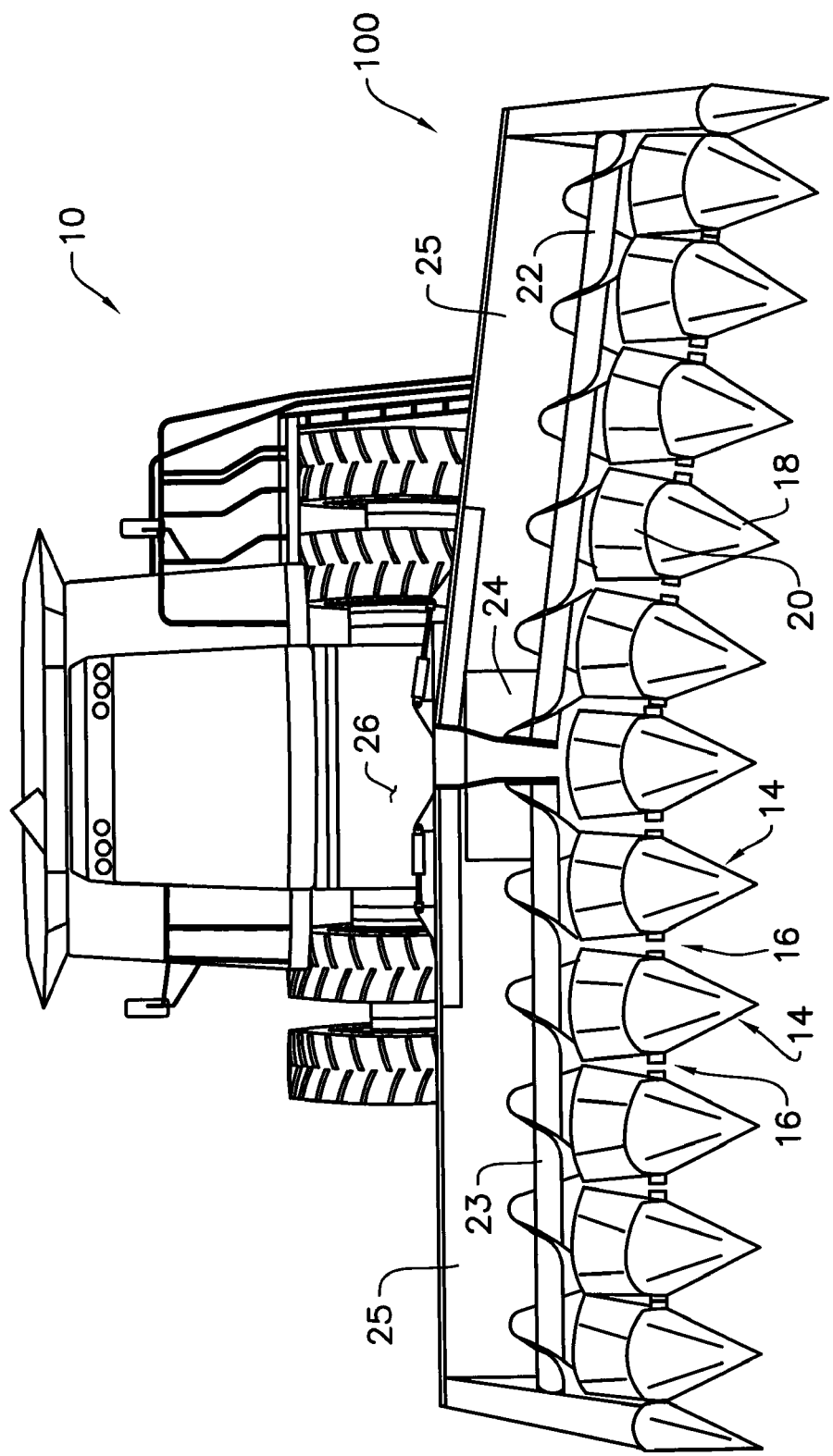
FIG. 11 is a front view of the combine and flexible header of FIG. 9 with the right side of the header lowered.
Figure 12:
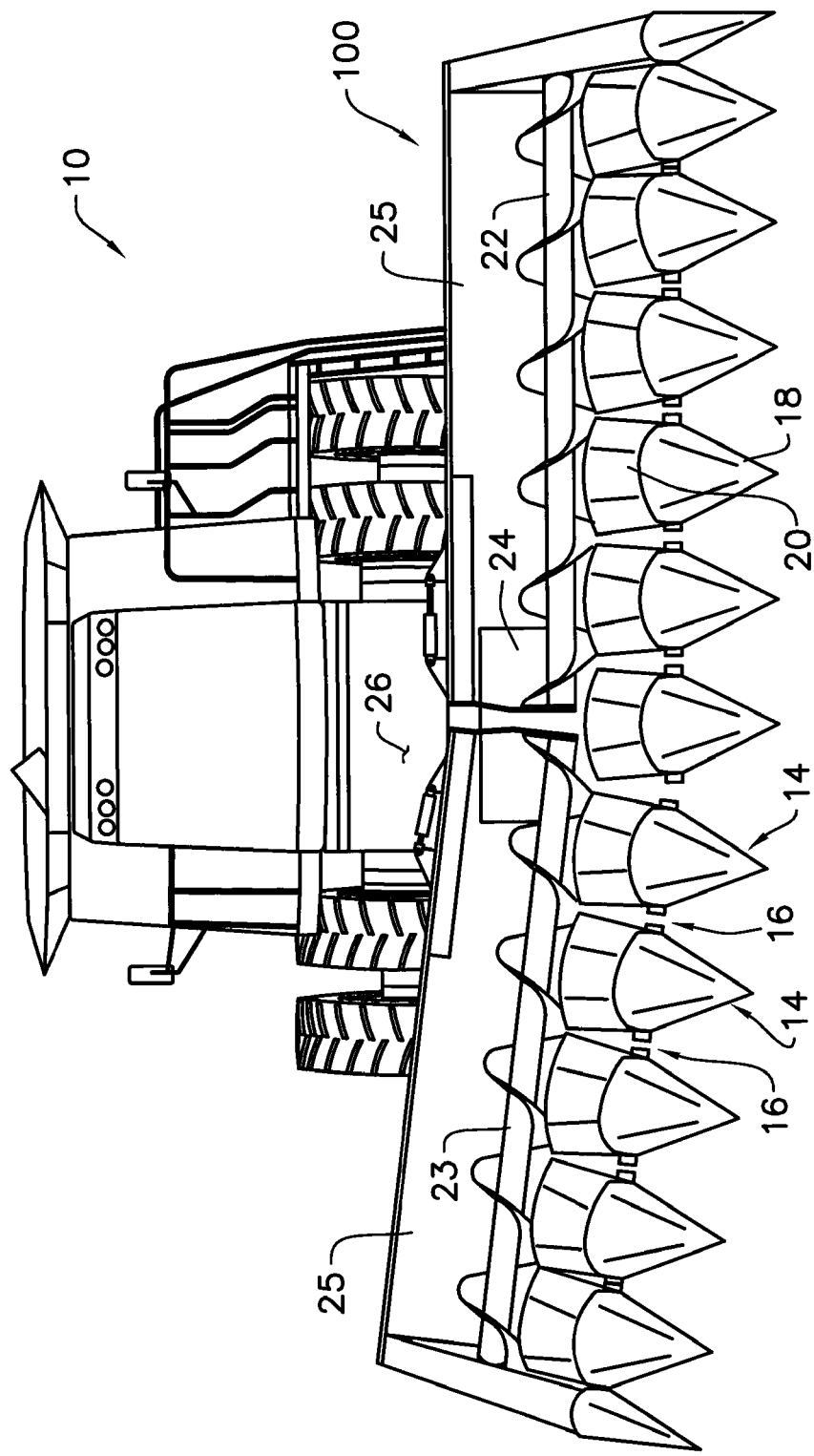
FIG. 12 is a front view of the combine and flexible header of FIG. 9 with the left side of the header raised.
Figure 13:
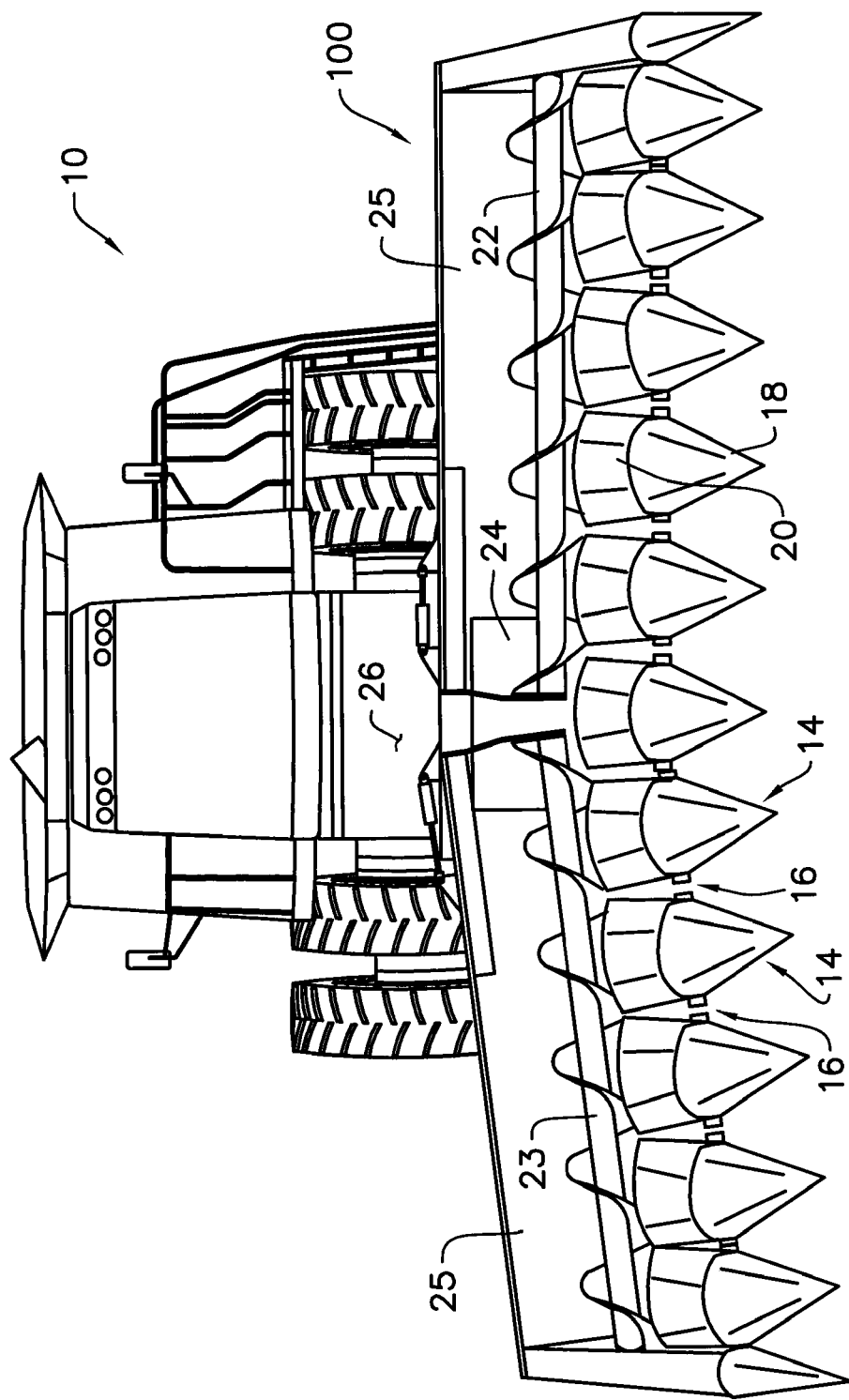
FIG. 13 is a front view of the combine and flexible header of FIG. 9 with the left side of the header lowered.

FIG. 9 is a front view of the combine of FIG. 1 but illustrating a preferred embodiment of a flexible corn head 100 coupled thereto in place of the conventional corn head 12. Except as described in detail later, the preferred flexible corn head 100 is substantially identical to the conventional header 12, including the manner and method of coupling it to the combine 10, except that the flexible header 100 preferably includes an additional subframe 200, a pivot assembly 300 which cooperates with one or more actuators to move sections of the header between raised and lowered positions, together or independently, and a modified auger center suspension assembly 400. The flexible header 100 may be readily adapted from a conventional header 12 or it may be an original equipment manufacture (OEM).

In comparing FIGS. 16-19 to FIGS. 5-8 it should be appreciated that having the ability to move sections or wings of the header up and down permits the header to more closely follow the contours of the terrain thereby avoiding missed corn rows that occur with conventional headers 12. When corn rows are missed, the operator is required to turn around in the field to separately pick the previously missed rows, resulting in wasted fuel and time, and thus, reducing profits.

Specifically, comparing FIG. 5 to FIG. 16, where the combine is traveling along the crest of a hill, with the conventional header 12 (FIG. 5) at its lower most position without running aground in the middle of the header, the ears at the far ends of the header will be missed because the ears are below the stalk rollers. However, with the flexible header 100 (FIG. 16), the left and right wings of the header can be lowered to more closely follow the crest of the hill, thereby ensuring that the ears of the corn rows at the far ends of the header are above the stalk rollers and will not be missed.

Likewise, comparing FIGS. 6 and 17, where the combine is traveling in a valley between hills, with the conventional header 12 (FIG. 6) at its lower most position without running aground at the far ends of the header, the ears in the middle of the header will still be missed because the ears are below the stalk rollers. However, with the flexible header 100 (FIG. 17), both sides or wings of the header can be raised to more closely follow the converging sides of the hill, thereby ensuring that the ears of the corn rows in the middle of the header are above the stalk rollers and will not be missed.

Similarly, comparing FIGS. 7 and 8 to FIGS. 18 and 19, where the combine is traveling along the base of a hill, with the conventional header 12 (FIGS. 7 and 8) at its lower most position without running aground at the far ends of the header, the ears in the middle of the header will be missed because the ears are below the stalk rollers. However, with the flexible header 100 (FIGS. 18 and 19), one side of the header can be raised while the other remains horizontal, to more closely follow the slope of the hill on the corresponding side of the combine, thereby ensuring that the ears of the corn rows in the middle of the header are above the stalk rollers and will not be missed.

Referring now to FIGS. 20-24, a preferred embodiment of a flexible corn header 100 is illustrated. As previously stated, the flexible corn header 100 is preferably substantially identical to the conventional header 12, including the manner and method of coupling it to the combine 10, except that the flexible header 100 preferably includes an additional subframe 200, a pivot assembly 300 and a modified auger center suspension assembly 400 each of which is discussed in detail below.

As previously stated, the header 100 is preferably adapted from a conventional header 12, although the header 100 could be an OEM manufacture. For purposes of this disclosure, the header 100 is hereinafter described and illustrated as a retrofit of an existing John Deere twelve row conventional header 12 that utilizes a central auger suspension system such as disclosed in U.S. Pat. No. 4,300,333 which is incorporated herein in its entirety by reference. The retrofitted header 12, includes a top beam 102 (best viewed in FIGS. 21 and 24), as well as an intermediate beam 104 (FIG. 20), bottom beam 106 (FIG. 20) and row unit support beam 108 (FIG. 20), all of which extend the full width of the header. Posts 110 extend between the top beam 102 and the intermediate beam 104. The header 12 also includes a back wall 25 that encloses the back side of the header except at the feeder house inlet 24. Those of ordinary skill in the art will understand that depending on the header make and model being retrofitted (or if it is an OEM manufacture) particular structural components of the header referred to in this description may not be present or may have a different configuration than shown and described.

Figure 20:
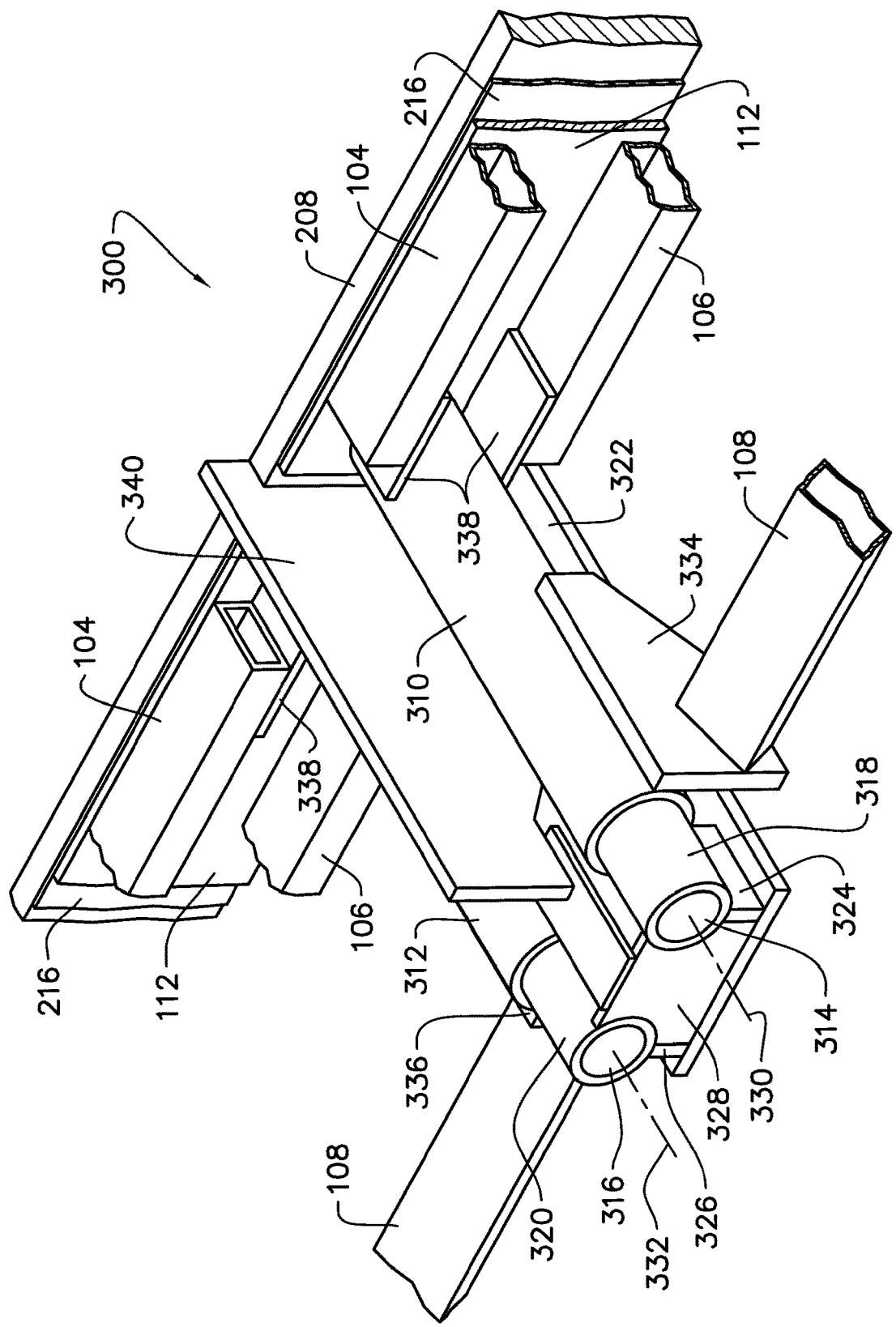
FIG. 20 is a perspective view of a preferred embodiment of a center pivot assembly of the flexible header of FIG. 9.
Figure 24:
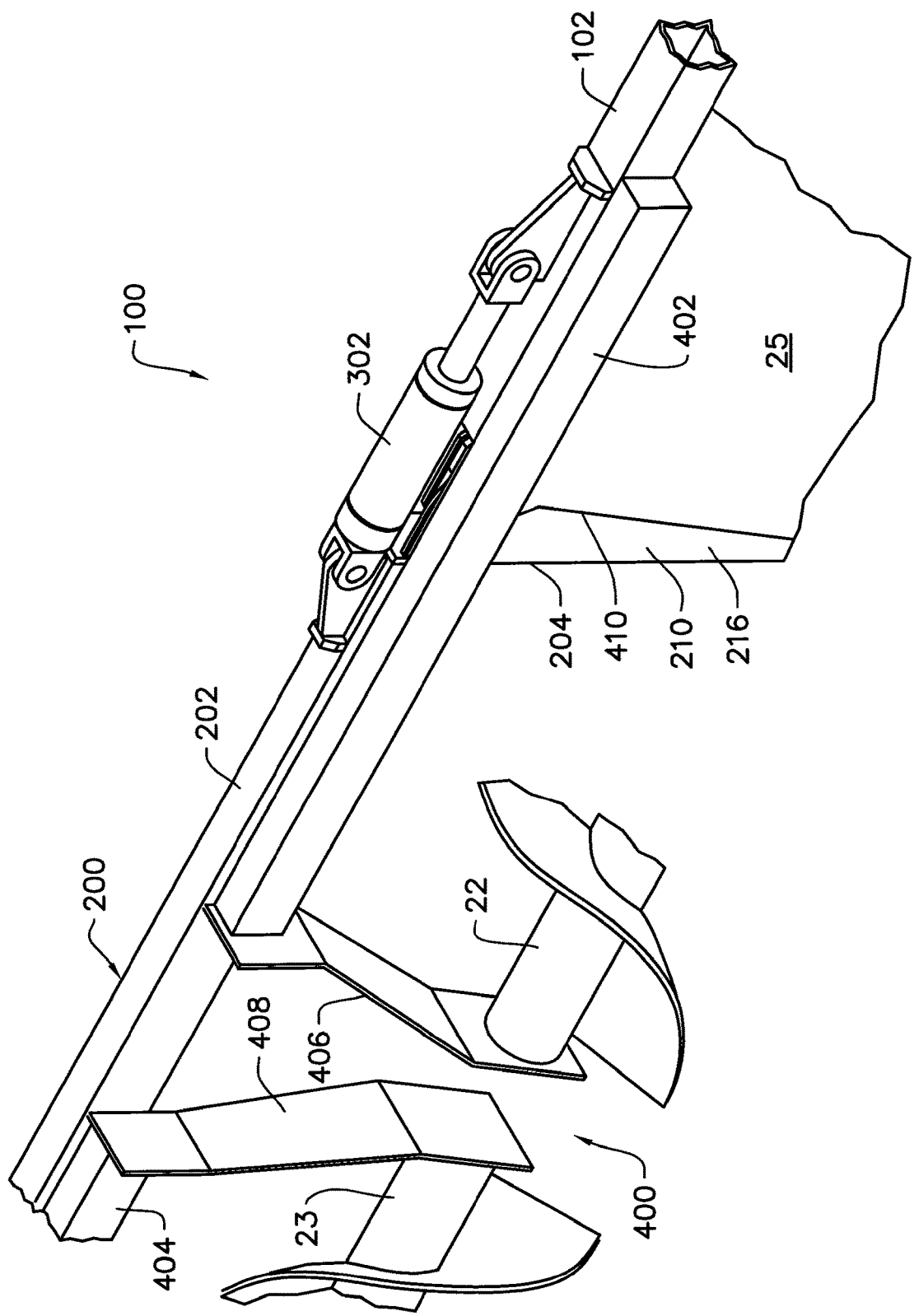
FIG. 24 is a perspective view of a preferred embodiment of the auger center mount of the header of FIG. 9.

As best illustrated in FIGS. 20 and 24, a section of the top beam 102 is removed to accommodate the subframe 200 (discussed below) and a section of the intermediate beam 104, bottom beam 106 and the row unit support beam 108 are removed to accommodate the pivot assembly 300 (discussed later). Because a section of the intermediate and bottom beams 104, 106 is removed, a stiffening plate 112 is preferably added to maintain the vertical spacing between the beams and the structural integrity of the header.

The subframe 200 preferably comprises a top member 202, left and right vertical members 204, 206 and a bottom member 208 welded together to define an interior frame opening having dimensions preferably corresponding in size to the feeder house inlet 24 of the header 100. Although not shown, the subframe 200 preferably includes or incorporates recesses to receive lugs and latch pins typical of conventional quick-connect header mounts.

Figure 25:
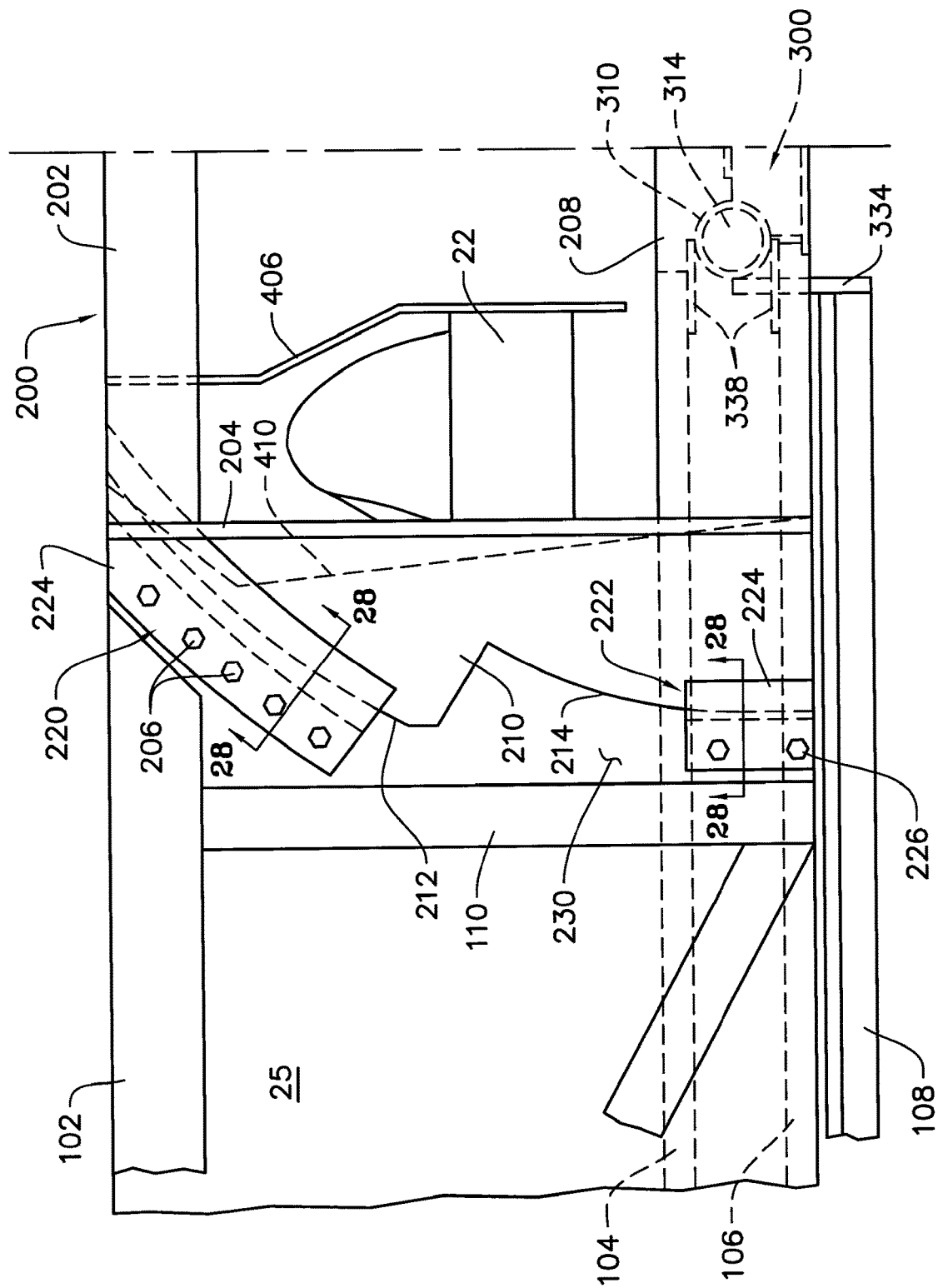
FIG. 25 is a rear elevation view of the left side of the flexible header of FIG. 9 illustrating a preferred embodiment of the top and bottom slide bracket assemblies.
Figure 26:
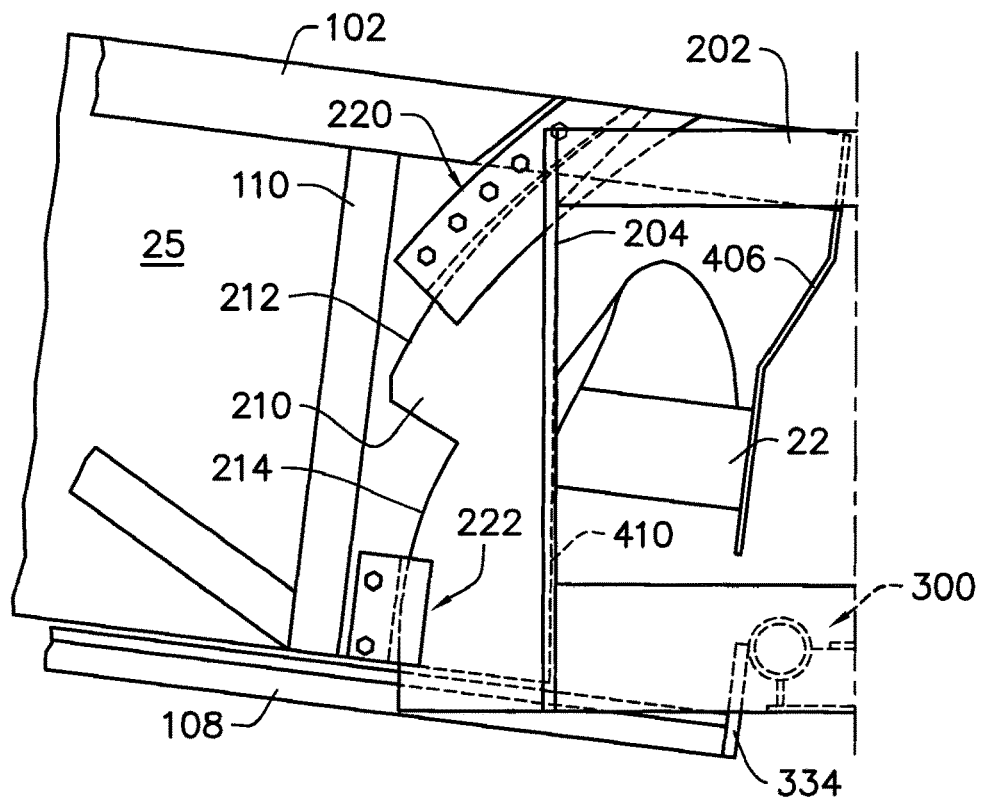
FIG. 26 is a rear elevation view of the left side of the flexible header of FIG. 9 in the raised position showing the relative movement of the top and bottom slide bracket assemblies with respect to the slide plate.
Figure 27:
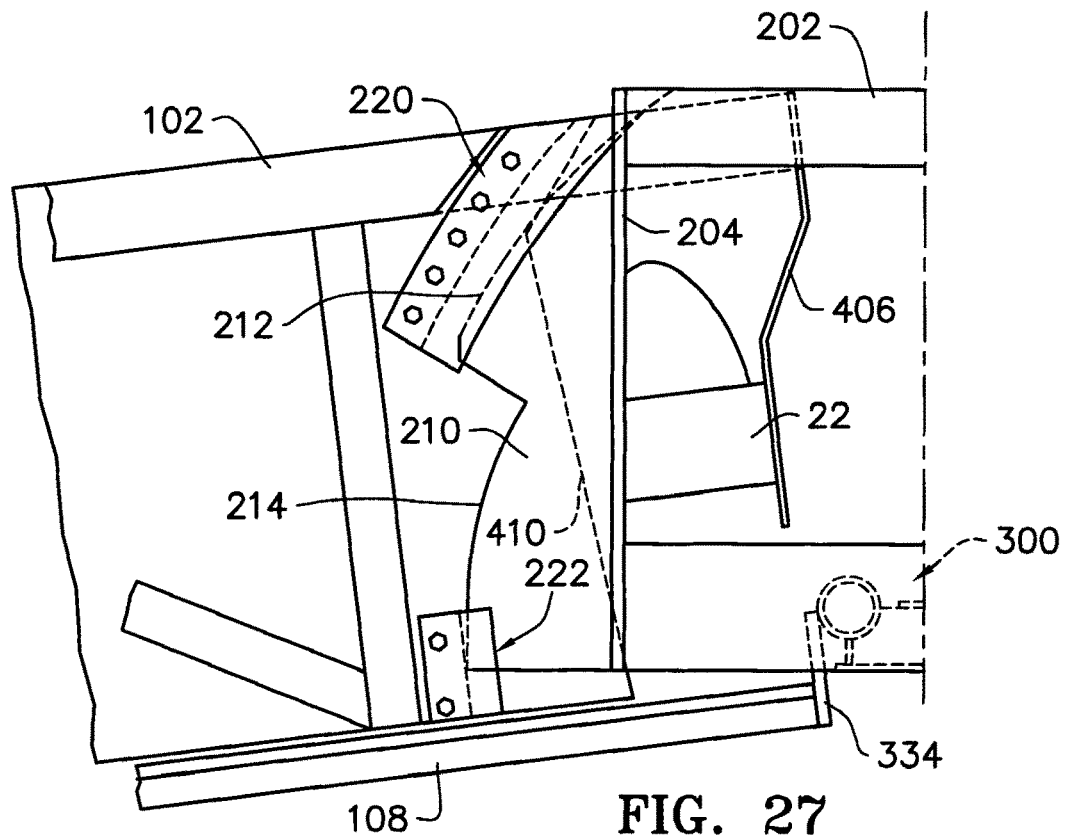
FIG. 27 is a rear elevation view of the left side of the flexible header of FIG. 9 in the lowered position showing the relative movement of the top and bottom slide bracket assemblies with respect to the slide plate.

FIG. 25 is a rear view of the left side of the subframe 200. The right side is a mirror image of the left side. A slide plate 210 extends outwardly from the left vertical member 204 and includes upper and lower arcuate edges 212, 214. A wear plate 216 such as high molecular weight (HMW) polyethylene or like material is preferably secured by countersunk tapping screws (not shown) or other suitably secure connection, to the front face of the slide plate 210. The wear plate 216 reduces wear and friction between overlapping surfaces (described later) as the header sections or wings are raised and lowered as best illustrated in FIGS. 26-27.

Figure 28:
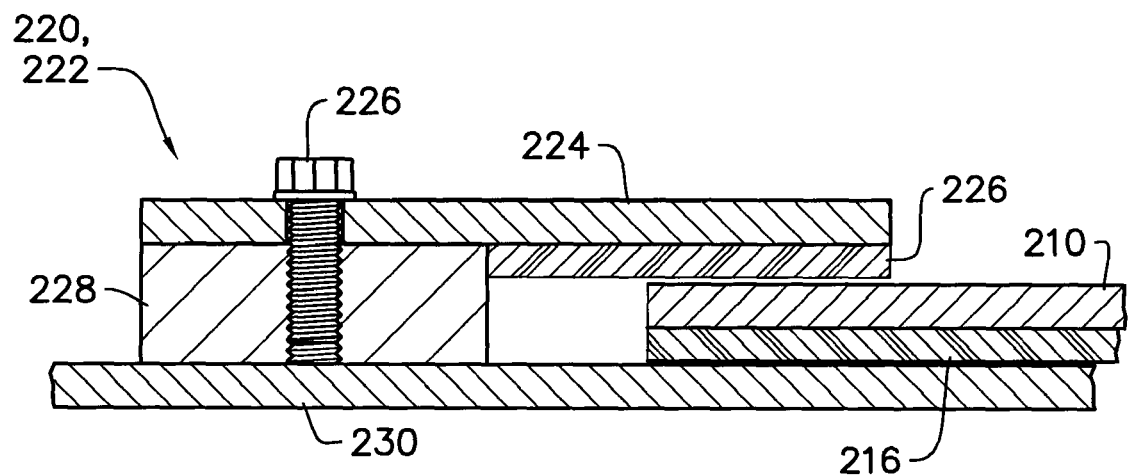
FIG. 28 is a cross-sectional view of the top slide bracket assembly and the slide plate as viewed along lines 28-28 of FIG. 25.

It should be appreciated that because the center of gravity of the header is forward of the subframe 200, and because the top beam 102 is no longer supported directly by the feeder house, the header 100 will tend to tip forwardly which would exert substantial bending stress on the pivot pins of the pivot assembly 300 (discussed later). Accordingly, to reduce the amount of bending stress on the pivot pins, upper and lower slide brackets 220, 222 are provided to prevent the header from tipping forwardly. As illustrated in FIGS. 25-27, these slide brackets 220, 222 receive the arcuate edges 212, 214 of the slide plate 210 respectively. FIG. 28 is a cross-sectional view of the slide brackets 220, 222 as viewed along lines 28-28 of FIG. 25. Each of the slide brackets 220, 222 include a rear plate 224 that is secured by a plurality of threaded connectors 226 to a threaded spacer block 228 welded to the face of the fill plate 230. Continuing to refer to FIG. 28, a wear member 216 is also secured to the inside face of the rear plate 224 thereby sandwiching the slide plate 210 between front and back wear plates 216. As the wings of the header pivot about the pivot pins as illustrated in FIGS. 26-27, the arcuate edge 212, 214 slide within the arcuate upper slide bracket 220 and the lower slide brackets 222, respectively.

Referring to FIG. 20, the pivot assembly 300 preferably comprises two rotatable or pivotable bushings 310, 312 disposed over parallel pins 314, 316 fixedly secured at their rearward end to the bottom member 208 of the subframe 200. Sleeves 318, 320 are disposed over the forward ends of the pins 314, 316 and are secured to a base plate 322 by vertical supports 324, 326 thereby retaining the bushings 310, 312 on the pins 314, 316. A lateral spacing plate 328 is also secured to the retainer sleeves 318, 320 and to the base plate 322 thereby maintaining the lateral spacing and parallel relationship of the pins 314, 316 and bushings 310, 312. The bushings 310, 312 are thus able to freely pivot about the stationary pins 314, 316. End caps 334, 336 are secured to the cut ends of the row unit supports 108 and to the bushings 310, 312. The rearward ends of the bushings 310, 312 are secured to the stiffener plate 112. Additionally, gussets 338 are welded to the bushings 310, 312 and to the intermediate and bottom beams 104, 106. Accordingly, it should be appreciated that as viewed in FIG. 20, and as best illustrated in FIGS. 21-23, the left and right ends of the header 100 are pivotable, respectively, about the longitudinal axis 330, 332 of pins 314, 316 by actuation of the left and right actuators 302, 304.

In a preferred embodiment, the pins 314, 316 are preferably fabricated from two 2½ inch diameter machined steel rods. The bushings 310, 312 are preferably comprised of four inch outside diameter sleeves having a ¾ inch wall thickness. The forward end sleeves 318, 320 are preferably comprised of 3½ inch outside diameter sleeves having ½ inch wall thickness. The pins 314, 316 are preferably press fit into 2½ inch diameter spaced holes drilled through bottom member 208 of the subframe 200. The bottom member 208 is preferably fabricated from eight inch by 1½ inch thick steel plate.

It should be appreciated that in order for the left and right sections of the header 100 to pivot about the axis 330, 332, the auger pan (not shown) must also be cut or split. However, in order to prevent the corn ears and other crop debris from falling through and passing under the split auger pan when one end of the header is raised relative to the other, a vertical baffle plate 340 is provided which projects a short distance above the auger pan.

Figure 21:
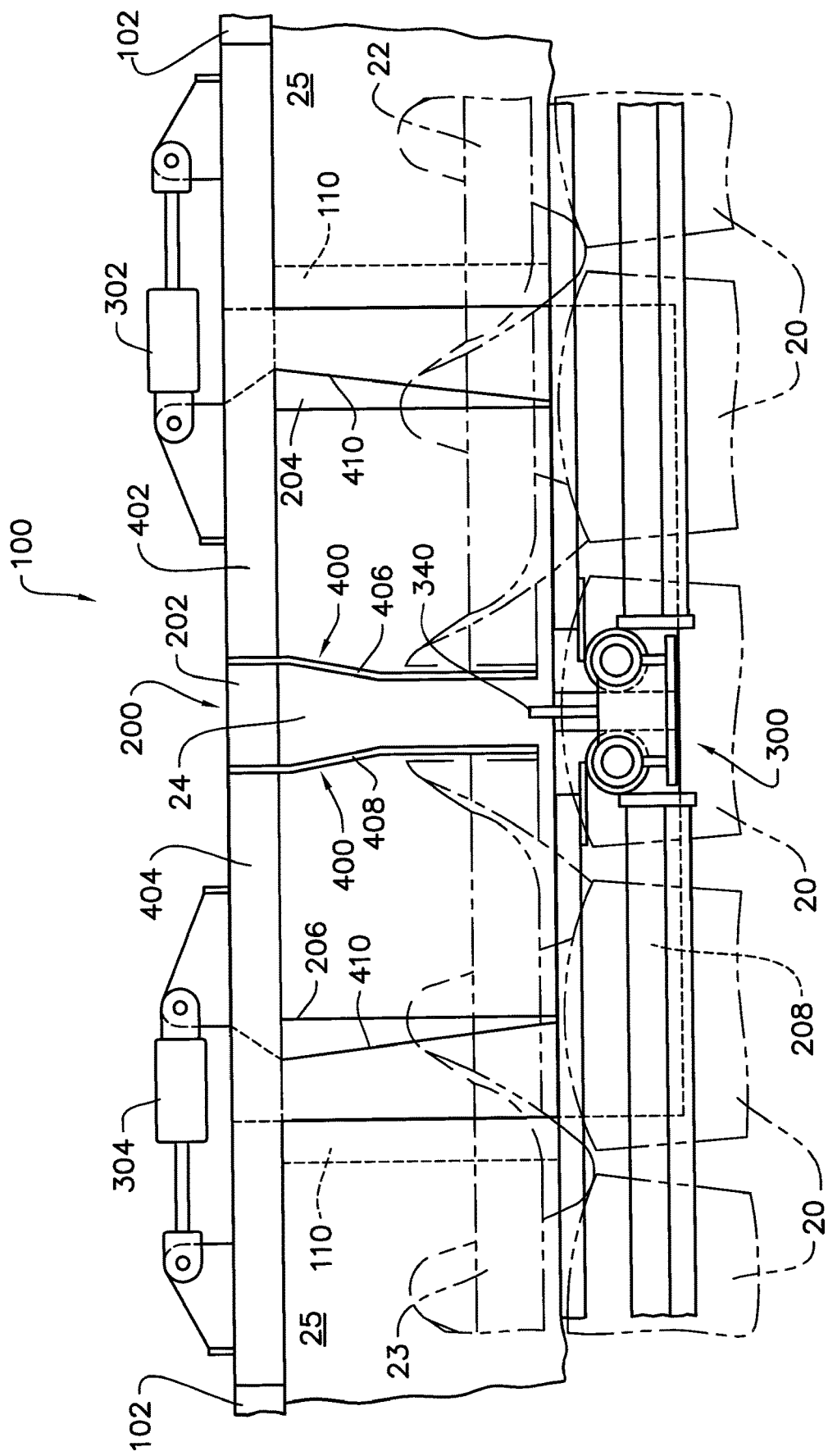
FIG. 21 is a front view of the center pivot assembly of FIG. 20 and header frame in the normal or level position.
Figure 22:
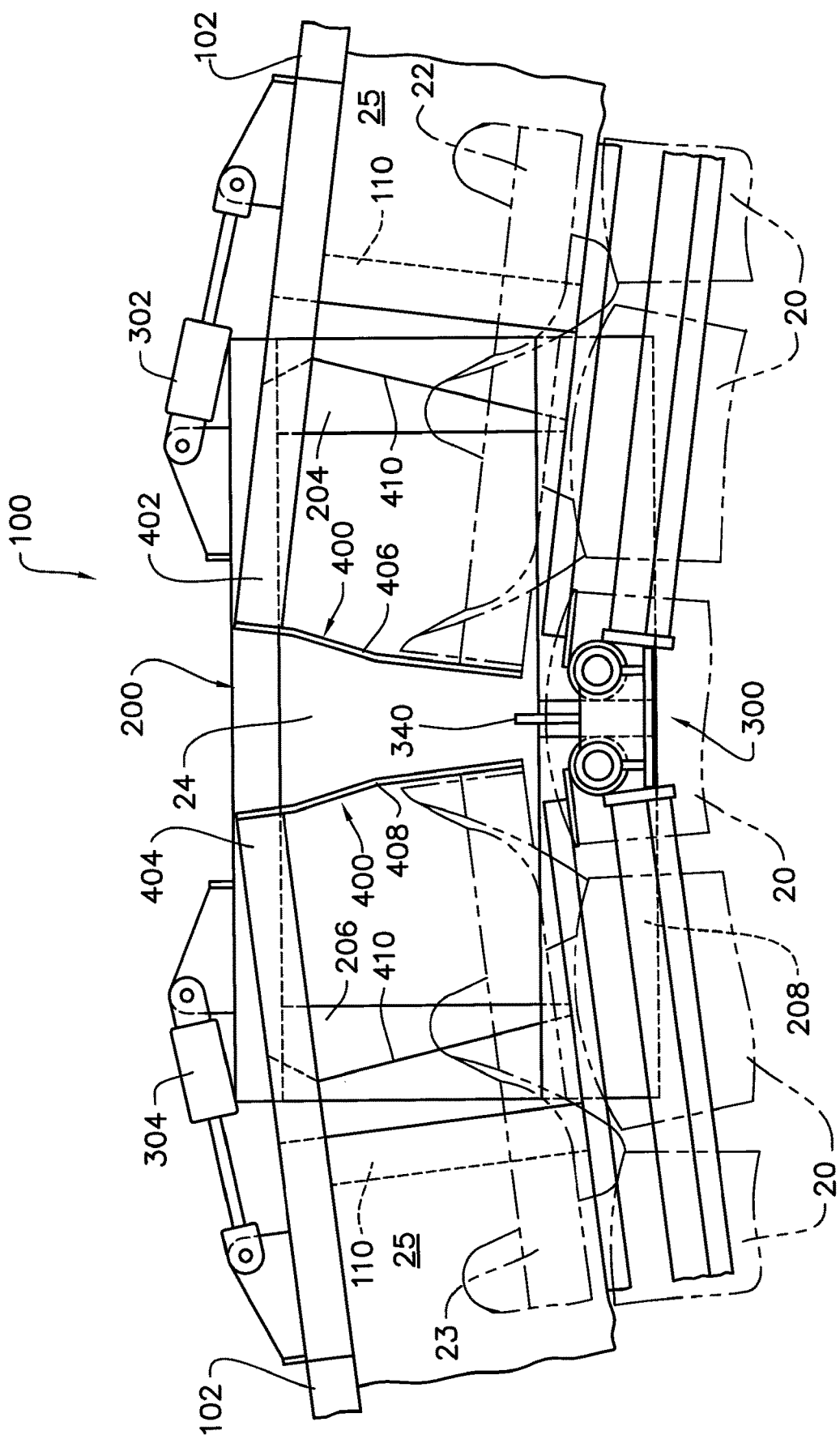
FIG. 22 is a front view of the center pivot assembly of FIG. 20 and header frame with the left and right ends in the lowered position.
Figure 23:
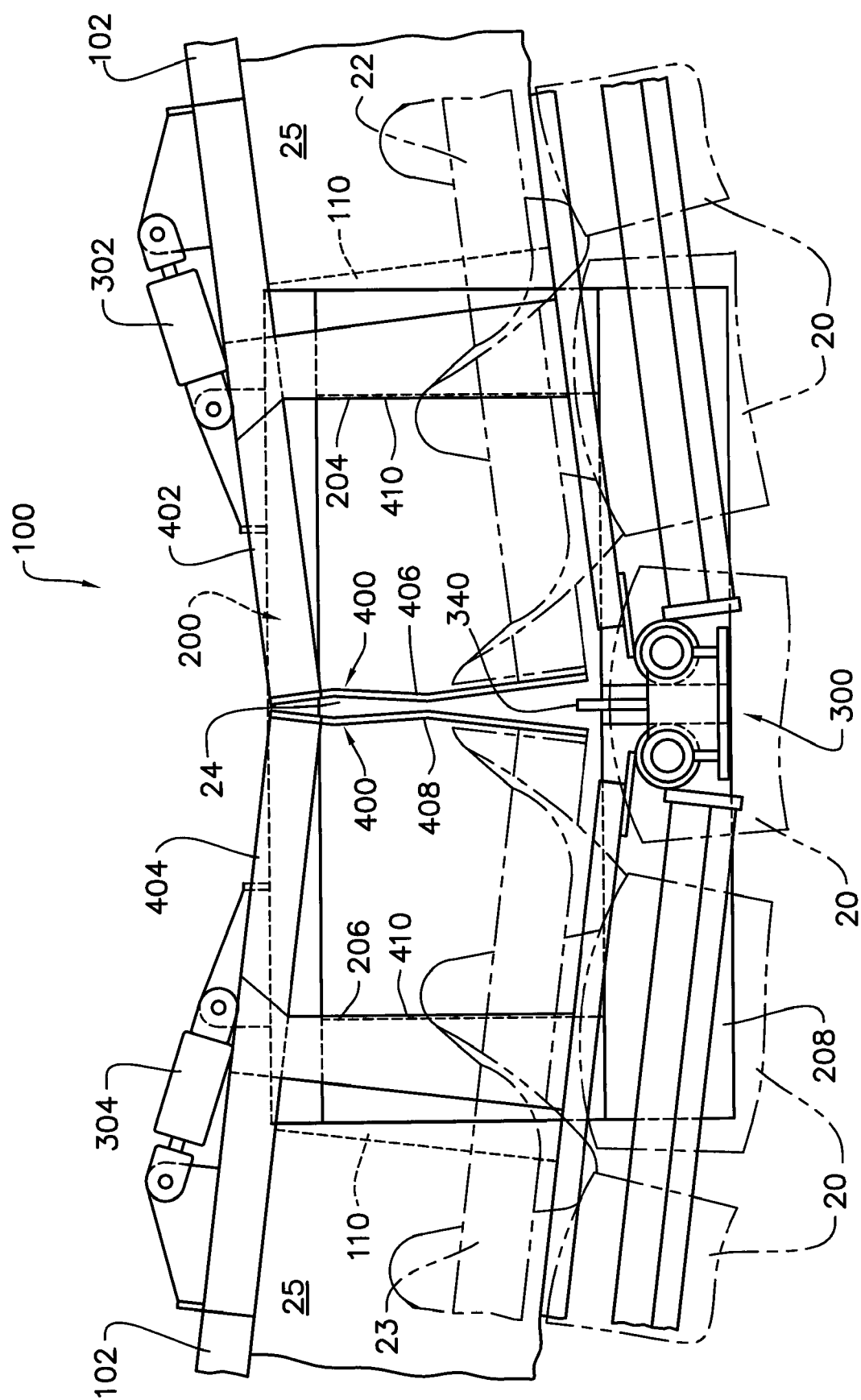
FIG. 23 is a front view of the center pivot assembly of FIG. 20 and header frame with the left and right ends in the raised position.

Referring to FIGS. 21-23, it should also be appreciated that the hood 20 of the center row unit spans the pivot assembly 300. Thus, the hood 20 of the center row should also be cut along its centerline to allow the respective sides of the hood to move relative to the other as each side of the header is raised or lowered. To prevent the corn ears and other crop debris from falling through the cut hood 20 of the center row, a hood cover plate (not shown) may be provided that is supported by the stationary vertical baffle plate 340 and which extends over the cut edges of the center row hood 20, thereby ensuring the cut edges of the center hood remain covered as they move below the stationary cover plate.

It should also be appreciated that in order for the left and right sides or wings of the header 100 to pivot about the axis 330, 332, the left and right cross auger sections 22, 23 must also move with their respective left and right header sections. Accordingly, referring to FIGS. 21-24, to permit the auger sections 22, 23 to move with the header sections, an auger center suspension assembly is required that moves with the respective left and right header sections. A preferred embodiment of a auger center suspension assembly 400 is best illustrated in FIG. 24 in conjunction with FIGS. 21-23.

The preferred auger center suspension assembly 400 preferably comprises left and right top beam extensions 402, 404 (FIG. 24) welded to the cut top beam 102 and extending inwardly toward the center of the header. Center support brackets 406, 408 are secured to the inward opposing ends of the beam extension 402, 404. The center support brackets 406, 408 preferably include a dogleg to minimize the distance between the opposing end of the left and right auger sections 22, 23, thereby minimizing axial interruption of the auger fighting, while at the same time preventing the brackets 406, 408 from interfering with each other as the header sections are raised and lowered as best illustrated between FIGS. 22 and 23. Other than the dogleg, each center support bracket 406, 408 preferably features the elements disclosed in U.S. Pat. No. 4,300,333 previously incorporated herein by reference.

Continuing to refer to FIGS. 21-24, the edge 410 of the fill plate 230 adjacent the feeder house inlet 24 is preferably cut at an angle, so that when the left and right header sections are raised, the edge 410 aligns with the inside edge of the subframe 200 (see FIG. 23). It should be appreciated that when comparing FIGS. 21-23, if the edge 410 of the backwall was not cut at an angle, the feeder house inlet opening would be partially blocked by the inside edge of the backwall when either or both sides of the header is raised.

Figure 14:
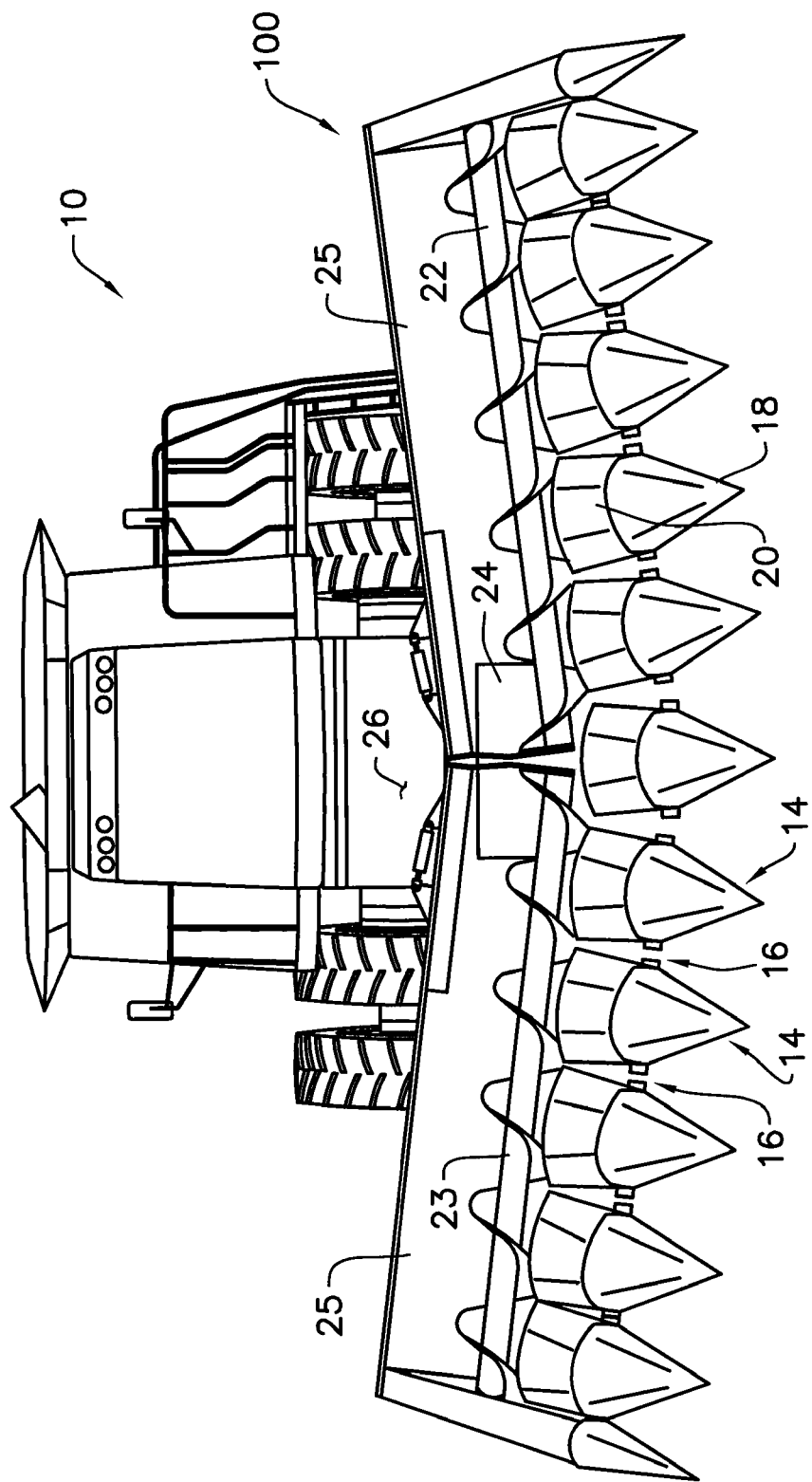
FIG. 14 is a front view of the combine and flexible header of FIG. 9 with both the left end and right sides of the header raised.
Figure 15:
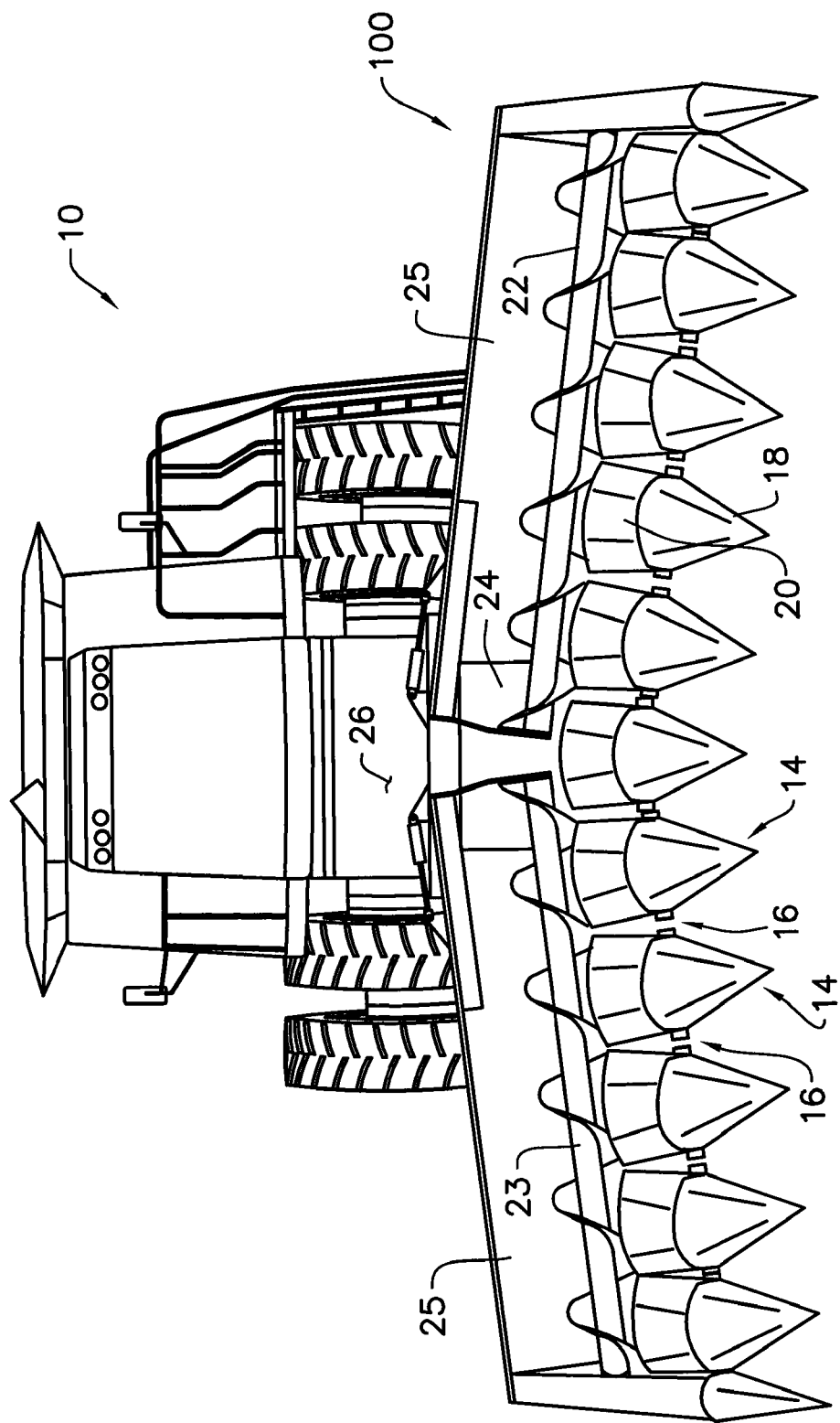
FIG. 15 is a front view of the combine and flexible header of FIG. 9 with both the left end and right sides of the header lowered.
Figure 18:
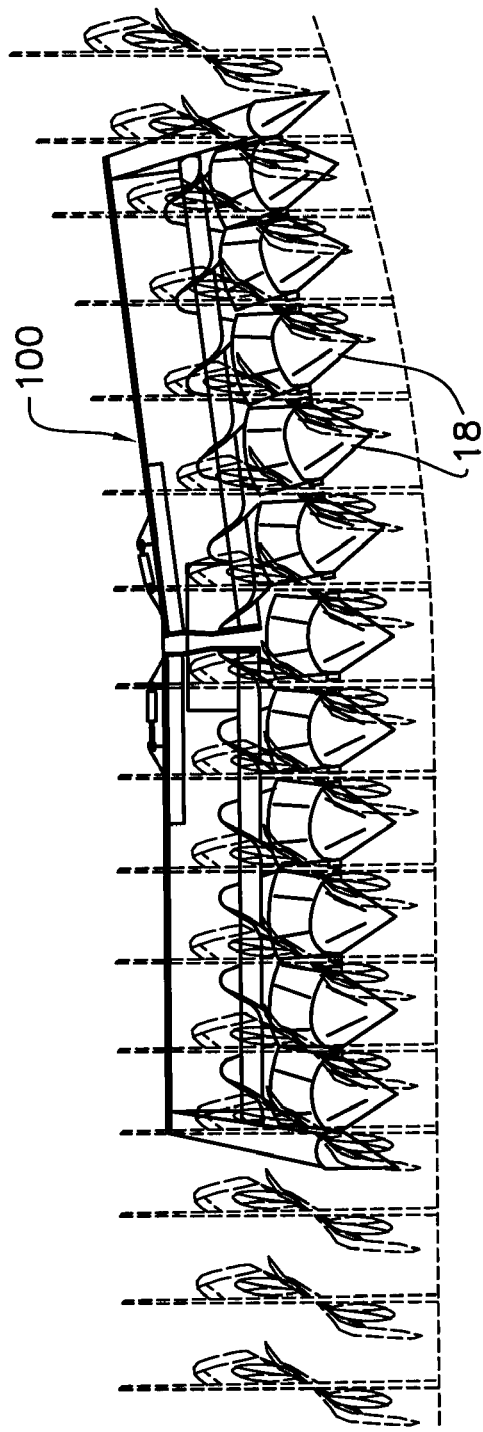
FIGS. 18 and 19 are illustrations of the flexible header of FIG. 9 at the base of a hill and showing how, with one side of the header raised and the other side level, no ears will be missed because all the corn ears across all of the rows of the header are above the stalk rollers.
Figure 19:
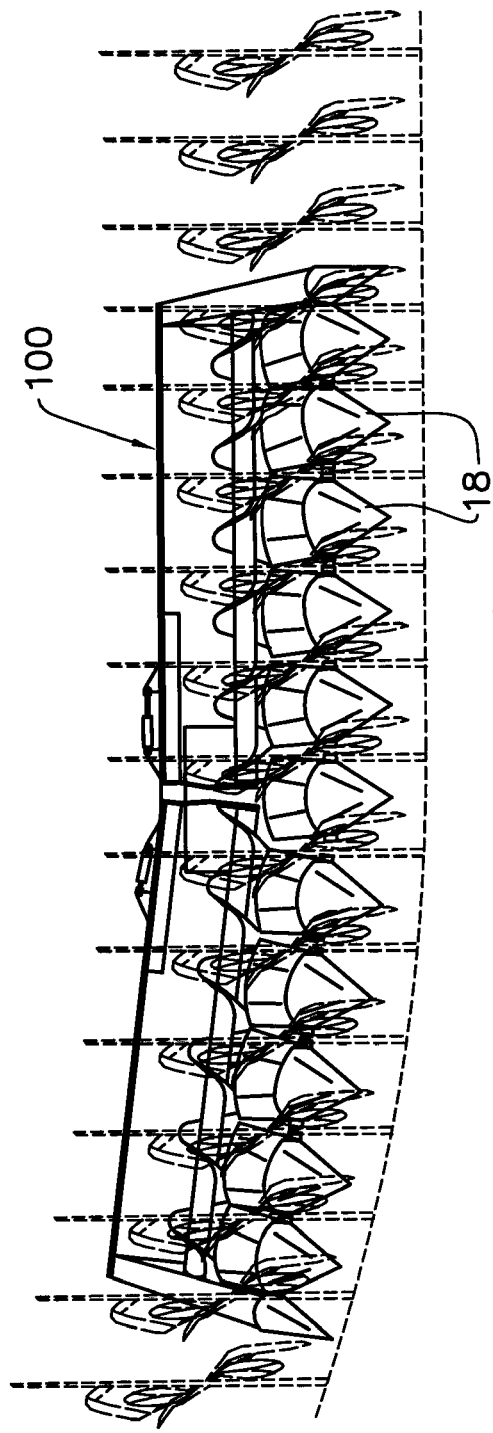
Figure 29:
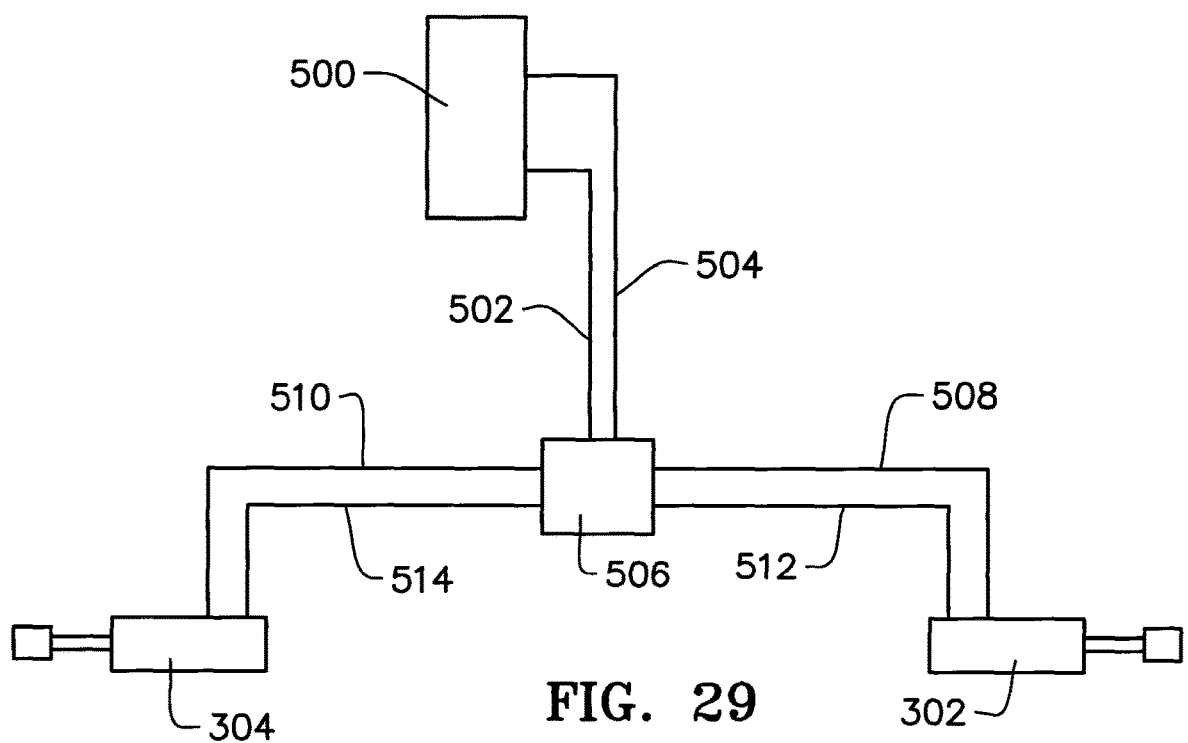
FIG. 29 is a schematic illustration of an embodiment of the hydraulic system for the flexible header of FIG. 9 wherein the left and rights sides of the header are raised and lowered together.

FIG. 29 schematically illustrates one method of coupling the actuators 302, 304 to the combine's hydraulic system. Hydraulic lines 502, 504 are coupled at one end to the combine's hydraulic system 500 and at the other end to a flow control valve 506. Left and right cylinder lines 508, 510 and left and right return lines 512, 514 are coupled between the flow control valve 506 to the left and right actuators 302, 304, respectively. With the hydraulic circuit of FIG. 29, both cylinders 302, 304 are actuated simultaneously such that both wings of the header raise and lower together as illustrated in FIGS. 14 and 15. However if the combine includes a lateral tilt feeder house, the feeder house can be tilted to cause the opposite wing of the header to be level while the other wing is raised or lowered such as illustrated in FIGS. 10-13.

Figure 30:
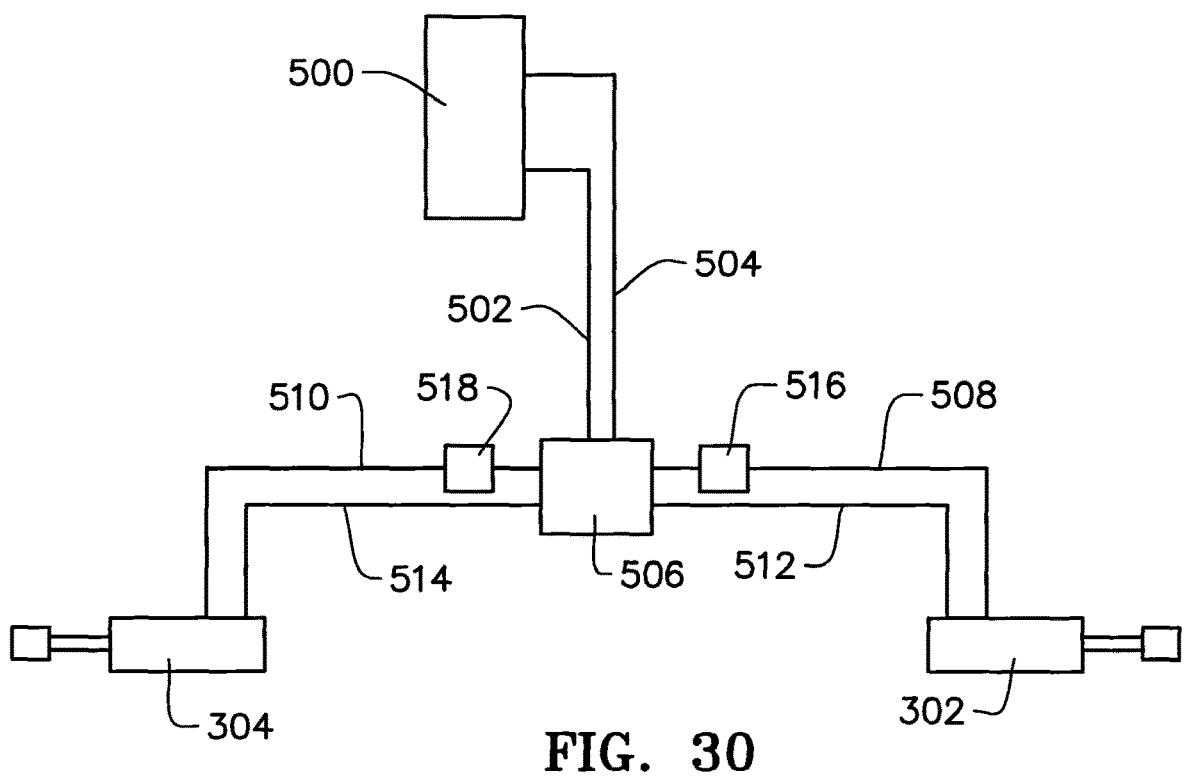
FIG. 30 is a schematic illustration of an embodiment of the hydraulic system for the flexible header of FIG. 9 wherein the left and right sides are raised and lowered independently of each other.

FIG. 30 schematically illustrates another method of coupling the actuators 302, 304 to the combine's hydraulic system. The hydraulic circuit of FIG. 30 is identical to the circuit of FIG. 29 except that first and second open/close valves 516, 518 are disposed along the cylinder feed lines 508, 510. By inserting the valves 516, 518, each wing of the cylinder is able to raise and lower independently of the other wing.

Those of ordinary skill in the art will appreciate that although the forgoing disclosure is particularly directed toward a corn header, the teachings herein could be applied to any row crop header. Furthermore, those of ordinary skill in the art will appreciate that although the preferred pivot assembly disclosed and illustrated herein utilizes two laterally spaced pins disposed along the center axis of the header, the pivot assembly may be disposed anywhere along the length of the header, or there may be multiple pivot assemblies disposed along the length of the header. Additionally, those of ordinary skill in the art will appreciate that the pivot assembly may comprise a single pivot pin supporting two rotatable bushings as opposed to two parallel pins each supporting a rotatable bushing. Furthermore, those of ordinary skill in the art will appreciate that the header may utilize a single actuator to raise and lower the header sections together or independently.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A hinged row crop harvesting head adapted to be mounted to a harvester for harvesting a row crop in a field, the hinged row crop harvesting head, comprising:
    a first frame section having a plurality of row units mounted thereon;
    a second frame section having a plurality of row units mounted thereon, the second frame section hinged with the first frame section about at least one pivot axis extending in a direction of travel of the harvester;
    wherein each of the plurality of row units diverge rearwardly from a forward tip and each of the row units further including at least one rotatable gathering chain and at least one rotatable stalk roll;
    at least one actuator coupled to the first frame section and the second frame section, the at least one actuator moving the first frame section and the second frame section with respect to each other about the at least one pivot axis as the harvester travels through a field harvesting crops while the at least one gathering chain and the at least one stalk roll of each of the plurality of row units of the first and second frame sections rotate.

2. The hinged row crop harvesting head of claim 1, further comprising an auger that extends across substantially an entire width of the hinged row crop harvesting head, the auger moving harvested crop to a center region of the hinged row crop harvesting head.

3. The hinged row crop harvesting head of claim 2, wherein the at least one pivot axis is located underneath and transverse to the auger.

4. The hinged row crop harvesting head of claim 2, wherein the auger comprises a first auger section supported by the first frame section and a second auger section supported by the second frame section.

5. The hinged row crop harvesting head of claim 1, wherein the at least one actuator moves the first frame section and second frame section together about the at least one pivot axis.

6. The hinged row crop harvesting head of claim 1, wherein the at least one actuator moves the first frame section and second frame section independently about the at least one pivot axis.

7. The hinged row crop harvesting head of claim 1, further comprising a subframe and wherein one end of the first frame section and one end of the second frame section is supported from the subframe.

8. The hinged row crop harvesting head of claim 1, wherein the at least one actuator moves an outer end of the first frame section and an outer end of the second frame section downwardly together below a horizontal plane extending through the at least one pivot axis.

9. The hinged row crop harvesting head of claim 1, wherein the at least one actuator moves an outer end of the first frame section and an outer end of the second frame section upwardly together above a horizontal plane extending through the at least one pivot axis.

10. The hinged row crop harvesting head of claim 1, wherein the at least one actuator moves an outer end of the first frame section above a horizontal plane extending through the at least one pivot axis and the at least one actuator moves an outer end of the second frame section downwardly below the horizontal plane.

11. The hinged row crop harvesting head of claim 1, wherein the at least one actuator moves an outer end of the first frame section above a horizontal plane extending through the at least one pivot axis while the outer end of the second frame section is substantially parallel with the horizontal plane.

12. The hinged row crop harvesting head of claim 1, wherein the at least one actuator moves, an outer end of the first frame section below a horizontal plane extending through said at least one pivot axis while the outer end of the second frame section is substantially parallel with the horizontal plane.

* * * * *